United States Patent [19]
Utsunomiya et al.

[11] Patent Number: 6,142,660
[45] Date of Patent: *Nov. 7, 2000

[54] SEMICONDUCTOR MANUFACTURING APPARATUS AND COMMAND SETTING METHOD

[75] Inventors: Norihiko Utsunomiya, Utsunomiya; Shigeyuki Uzawa, Naka-machi, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,546

[22] Filed: Jun. 6, 1997

[30] Foreign Application Priority Data

Jun. 14, 1996 [JP] Japan .................................. 8-154073

[51] Int. Cl.[7] ...................................................... G06F 19/00
[52] U.S. Cl. .................... 364/468.28; 364/191; 364/192; 364/188
[58] Field of Search ...................... 364/468.28, 143–147, 364/188–192, 468.24, 474.22, 474.23; 702/184; 355/53; 395/105

[56] References Cited

U.S. PATENT DOCUMENTS

| | | | |
|---|---|---|---|
| 5,029,065 | 7/1991 | Nau et al. | 364/146 |
| 5,197,118 | 3/1993 | Sato et al. | 395/105 |
| 5,249,016 | 9/1993 | Tanaka | 355/53 |
| 5,319,353 | 6/1994 | Ohnishi et al. | 364/188 X |

Primary Examiner—William Grant
Assistant Examiner—Steven R. Garland
Attorney, Agent, or Firm—Fitzpatrick, Cella, Harper & Scinto

[57] ABSTRACT

A semiconductor manufacturing method and apparatus using a plurality of maintenance commands for automatically measuring errors caused by the apparatus or caused by a wafer treatment process, by using measuring functions of the apparatus. The apparatus includes a display device for displaying a list of the plurality of maintenance commands, a console-side control device for enabling an operator to select some of the plurality of maintenance commands displayed by the display device, to generate a maintenance menu in which some of the plurality of maintenance commands are combined as desired by the operator and to edit the maintenance menu, a storage device for storing the maintenance menu generated and edited using the console-side control device and an apparatus-side control device for successively executing the maintenance commands in the maintenance menu stored in the storage device when the apparatus-side control device receives an instruction to execute the maintenance menu.

18 Claims, 18 Drawing Sheets

| FIG. 4A | FIG. 4B |

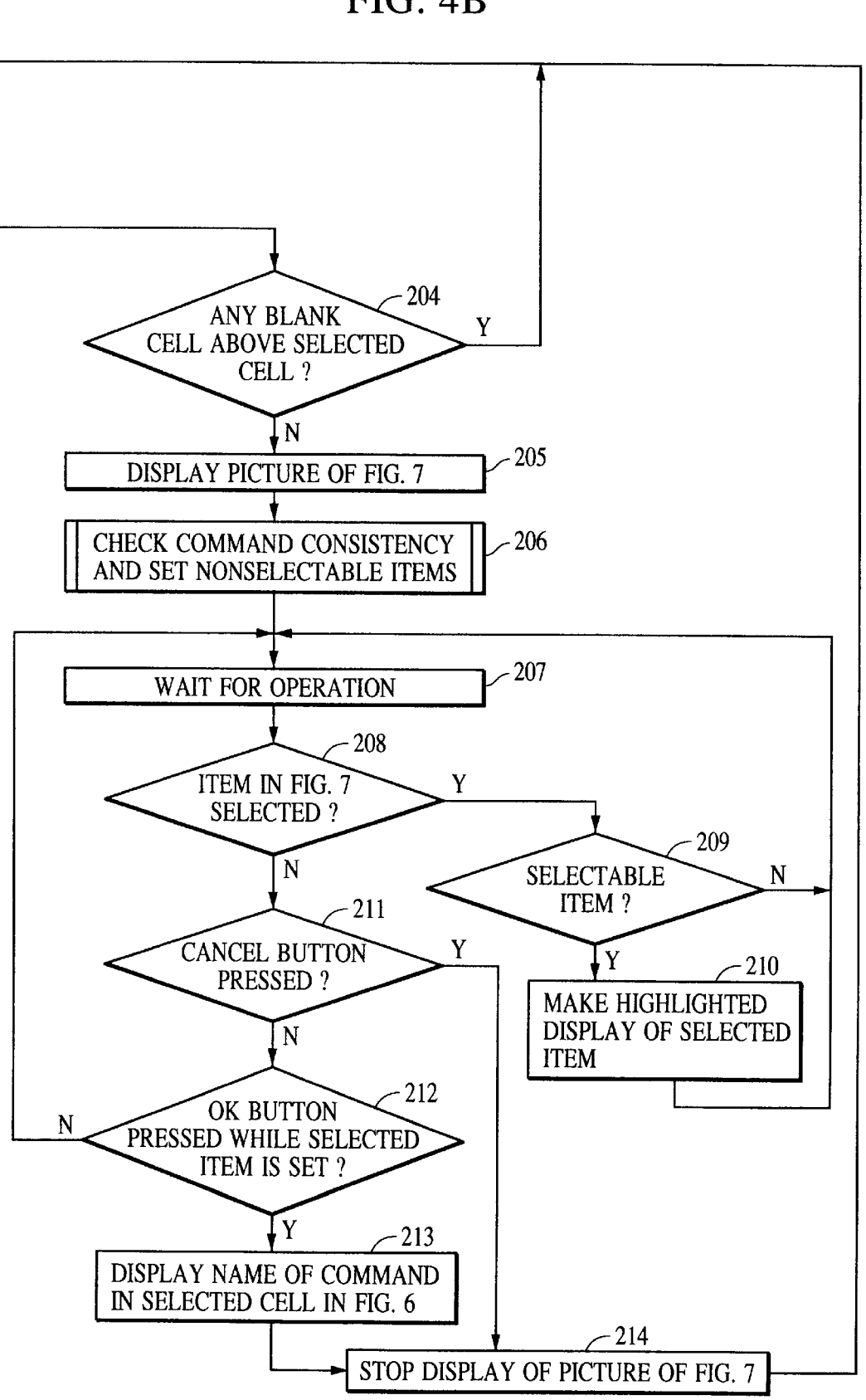

SEMICONDUCTOR MANUFACTURING APPARATUS AND COMMAND SETTING METHOD

BACKGROUND OF THE INVENTION

1. Field of the Invention

The present invention relates to a semiconductor manufacturing apparatus and, more particularly, to a semiconductor manufacturing apparatus for printing a semiconductor device circuit or a device pattern on a semiconductor wafer and to a method of using measuring functions of the manufacturing apparatus to improve maintenance of the apparatus.

2. Description of the Related Art

A semiconductor exposure apparatus, e.g., a stepper used in the process of manufacturing a semiconductor device is an apparatus in which a reduced image of a fine pattern formed on a reticle (or mask) is projected onto a wafer, and in which a plurality of shot areas on the wafer are successively positioned to be exposed to the projected pattern. Currently, there are two types of steppers used: a step-and-repeat type in which the entirety of a shot area of a wafer is exposed at one time, each time the wafer is moved one step, and a step-and-scan type in which a shot area of a wafer is exposed in a scanning manner each time the wafer is moved one step.

In such semiconductor exposure apparatuses, there is a need to correct printing errors due to changes in the apparatus over time and/or printing errors caused by the particular wafer treatment process. It is thought that errors due to (1) the apparatus are those caused by changes over time in the shapes of the structural members of the apparatus and by deterioration over time of either moving parts of the apparatus or a projection lens that is used to project reticle patterns onto a wafer, and (2) the particular wafer treatment process are those caused by warp, expansion or contraction of a wafer due to wafer heat treatment or the like and by irregularities in the wafer surface due to etching, doping, deposition or the like in the wafer treatment process.

Printing errors resulting from such causes appear as various errors, such as an XY-shift error of a printed pattern with respect to a shot area on a semiconductor wafer, a misalignment of patterns printed on a semiconductor wafer, a magnification error of an array of printed patterns with respect to an array of shot areas through a wafer (wafer magnification error), a magnification error in patterns in one shot (shot magnification error), a focus error, and so on.

In the above-mentioned semiconductor exposure apparatuses, changes over time of the apparatus and changes caused by the particular wafer treatment process are related to the errors. Therefore, to prevent such errors, correction values with respect to causes related to each error are managed as offset values. For example, with respect to an XY-shift error, an alignment offset value for correcting a cause of a change over time of the apparatus and an XY-shift offset value for correcting a change caused by the particular wafer treatment process are prepared.

Methods of measuring such offset values by using various measuring functions of a semiconductor exposure apparatus are known. Conventionally, however, an operator executes measurements for maintenance of an apparatus by using measuring functions of the apparatus and performs correction value measurements and actual correction as occasion arises.

Conventionally, when operations for maintenance of an apparatus are performed, an operator selects maintenance commands according to maintenance items and executes operations by the maintenance commands. Therefore, when a periodical maintenance process or the like is executed by a plurality of maintenance commands, there is a possibility of omitting execution of some of the maintenance commands or occurrence of an operation execution order error such that the overall maintenance process, including measurement of offset values, cannot be correctly executed.

SUMMARY OF THE INVENTION

In view of these circumstances, an object of the present invention is to provide a semiconductor manufacturing method and apparatus capable of being correctly maintained and capable of always operating accurately and to provide a method of setting commands for execution of maintenance of the apparatus.

To achieve these objects, according to the present invention, there is provided a semiconductor manufacturing apparatus using a plurality of maintenance commands for automatically measuring errors caused by the apparatus or caused by a wafer treatment process, by using measuring functions of the apparatus, the apparatus comprising display means (e.g., a console display) for displaying a list of the plurality of maintenance commands, console-side control means (e.g., a console central processing unit) for enabling an operator to select some of the plurality of maintenance commands displayed by the display means, to generate a maintenance menu in which some of the plurality of maintenance commands are combined as desired by the operator and to edit the maintenance menu, storage means (e.g., a hard disk drive unit) for storing the maintenance menu generated and edited using the console-side control means, and apparatus-side control means (e.g., a main central processing unit) for successively executing the maintenance commands in the maintenance menu stored in the storage means when said apparatus-side control means receives an instruction to execute the maintenance menu.

To achieve the above-described objects, the present invention also provides a semiconductor manufacturing method for use with a semiconductor manufacturing apparatus using a plurality of maintenance commands for automatically measuring errors caused by the apparatus or caused by a wafer treatment process, by using measuring functions of the apparatus. The method includes displaying, using display means, a list of the plurality of maintenance commands, enabling an operator, using console-side control means, to select some of the plurality of maintenance commands displayed by the display means, to generate a maintenance menu in which some of the plurality of maintenance commands are combined as desired by the operator and to edit the maintenance menu, storing, using storage means, the maintenance menu generated and edited using the console-side control means and successively executing, using apparatus-side control means, the maintenance commands in the maintenance menu stored in the storage means when the apparatus-side control means receives an instruction to execute the maintenance menu.

The above-described display means or step may display a plurality of input cells for inputting the maintenance commands constituting the maintenance menu when the maintenance menu is generated, and the console-side control means may generate and edit the maintenance menu as the operator alternately selects one of the input cells and one of the maintenance commands in the maintenance command list. Also, the display means or step may differentiate a displayed state of one of the input cells selected at the time of generating the maintenance menu from a displayed state of the unselected input cells. Also, the display means or step may differentiate a displayed state of some of the maintenance commands in the maintenance command list, which are suitable for input to one of the input cells selected at the time of generating the maintenance menu from a displayed state of maintenance commands in the maintenance command list, which are unsuitable for input to the input cell.

The display means or step may display a plurality of maintenance menus stored in the storage means at the time of maintenance menu execution so that one of the maintenance menus can be selected. Also, the display means or step may display executed states of the maintenance commands in the maintenance menu selected and executed, so that the executed states are displayed in the same order as that in which the maintenance commands have been executed. The display means or step may also display a result of measurement in accordance with each maintenance command in the maintenance menu selected and executed.

The display means or step may display a record of measured values obtained from each of the executed maintenance commands.

To achieve the above-described objects, according to the present invention, there is also provided a method of setting commands to a semiconductor manufacturing apparatus capable of using a plurality of maintenance commands for automatically measuring errors caused by the apparatus or caused by a wafer treatment process by using measuring functions of the apparatus, the method comprising the steps of forming, as a maintenance menu, a group of various maintenance commands to be applied to the apparatus, and registering the maintenance menu as one maintenance menu command.

In this method, maintenance menu commands formed in the above-described manner may be grouped with respect to execution intervals.

More specifically, the present invention uses a man-machine interface capable of successively executing a combination of a plurality of maintenance commands as a single command, or setting any desired combination of maintenance commands, or enabling maintenance commands to be grouped with respect to execution intervals such as daily, weekly and monthly intervals at the time of combining the maintenance commands.

According to the present invention, a combination of maintenance commands can be successively executed as a single command, so that improper maintenance command execution due to operation error can be prevented. Also, the present invention enables maintenance commands to be combined as desired, so that an item of maintenance can be executed particularly frequently according to a user's need. Further, the present invention enables maintenance commands to be grouped with respect to execution intervals at the time of combining the maintenance commands, so that maintenance can be executed by suitable timing.

Thus, the present invention makes it possible to provide a semiconductor manufacturing apparatus capable of being correctly maintained and capable of always operating accurately.

These and other objects, features and advantages of the present invention will become apparent from the following detailed description of a preferred embodiment of the invention with reference to the accompanying drawings.

DESCRIPTION OF THE PREFERRED EMBODIMENT

Figure 1:
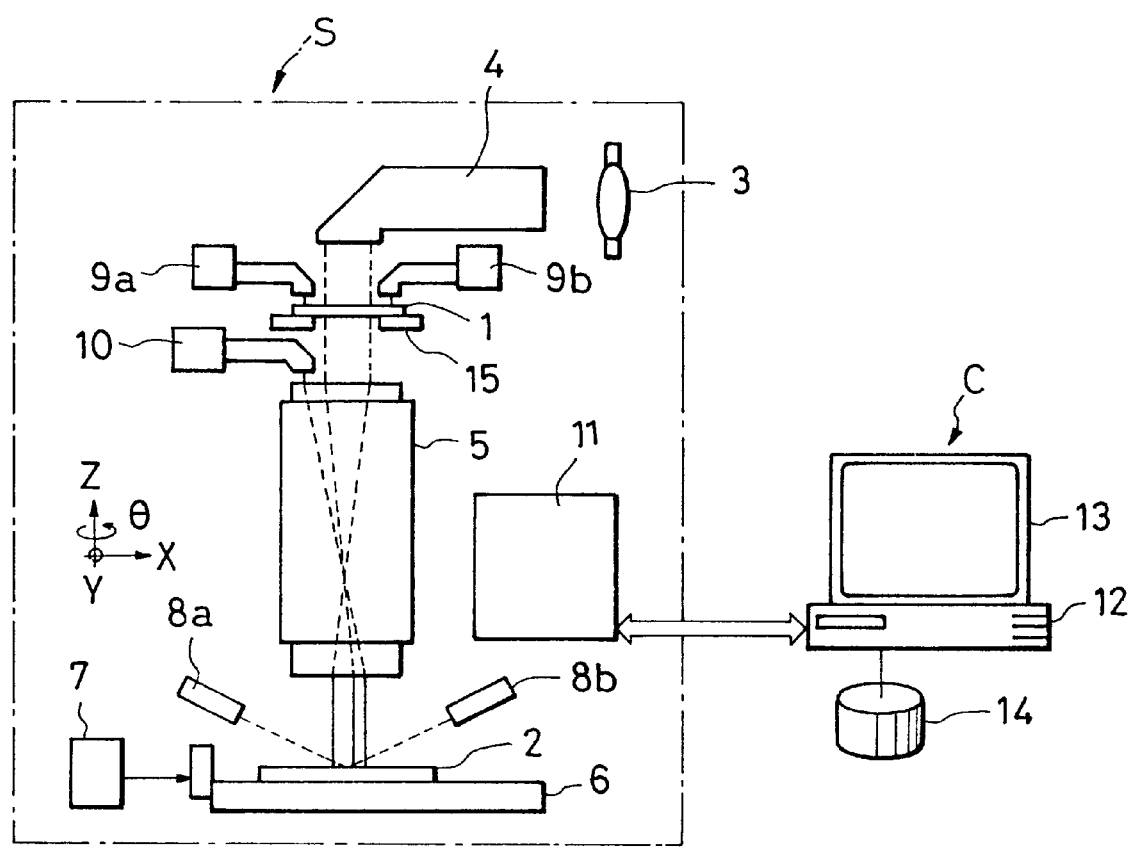
FIG. 1 is a schematic diagram of an embodiment of a semiconductor manufacturing apparatus in accordance with the present invention.

A preferred embodiment of the present invention will be described with reference to the accompanying drawings. FIG. 1 shows an exposure apparatus, e.g., a stepper for manufacturing a semiconductor device to which the present invention is applied. FIG. 1 illustrates components in a main body S of the stepper and a console computer C, which is operated by an operator, to control the operation of the stepper.

The stepper uses a mask 1 (original plate) called a "reticle" and having patterns for manufacturing a semiconductor device formed on its lower surface. Each of a plurality of shot areas of a semiconductor wafer 2 is exposed to a projected, reduced image of the patterns on the reticle 1. The stepper has an exposure light source 3 such as an ultra-high-pressure mercury lamp or a KrF (ArF) excimer laser, and an illumination optical system 4 for illuminating the reticle 1 with exposure light from the exposure light source 3. The reduced images of the patterns on the reticle 1 illuminated with the exposure light from the exposure light source 3 by the illumination optical system 4 are projected upon the wafer 2 by a reduction projection lens 5 forming a projection optical system to be printed in one of the plurality of shot areas on the wafer 2.

An XY-stage 6 supports the wafer 2 and moves in a stepping manner in the X- or Y-direction each time the patterns of the reticle 1 are printed in one of the shot areas on the wafer 2. The XY-stage 6 comprises a θ-Z-tilt stage for moving the wafer 2 in the Z-direction, parallel to the optical axis of the projection lens 5, for rotating the wafer 2 in the θ-direction about the Z-axis and for tilting the wafer 2 by rotation about the X- or Y-axis. A well-known laser interference type distance measuring device (laser interferometer) 7 is provided to measure a position on the XY-surface of the XY-stage 6. A focus detection system, including a projection system 8a and a light receiving system 8b, is provided to detect the position of the wafer surface in the Z-direction from the focal plane of the projection lens 5 and to detect a tilt of the wafer surface with respect to the focal plane. The projection system 8a emits light to the wafer surface and the light receiving system 8b receives reflected light from the wafer surface. The position in the Z-direction and a tilt of the wafer 2 are detected by examining the position at which the reflected light is incident upon the light receiving system 8b.

A through-the-reticle (TTR) alignment detection system, including units 9a and 9b, is used to detect the positional relationship in an XY-plane between reticle setting marks (not shown) on the reticle 1 and reticle setting reference marks (not shown) provided on the stepper main body (ordinarily, on the lens barrel of the projection lens 5). Alignment of the reticle 1 is performed by using a reticle stage 15 on which the reticle 1 is supported and which can be moved in each of the X-, Y- and θ-directions along the XY-plane.

The TTR alignment detection system 9a, 9b is also used to detect alignment marks (not shown) on the wafer 2 through the reticle 1 and the projection lens 5. The TTR alignment detection system 9a, 9b detects a misalignment of the wafer 2 and/or each shot area on the wafer 2 in an XY-plane. A non-TTR alignment system 10 is also provided. Only one unit of the non-TTR alignment system 10 is shown in FIG. 1 but another unit of the non-TTR alignment system 10 is provided 90° apart from the illustrated one, in the XY-plane. This non-TTR alignment system 10 detects alignment marks on the wafer 2 through the projection lens 5 to detect a misalignment of the wafer 2 and/or each shot area on the wafer 2 in the XY-plane.

A main central processing unit (CPU) 11 is provided for overall control of the above-described operating units. The main CPU 11 sends operation instructions (commands) to each unit in the stepper S on the basis of an operating instruction (command) from a CPU on the console C side to control the operation of the stepper unit. A multiplicity of such operation instruction commands are prepared for the stepper S and stored in a storage area of the main CPU 11. Maintenance commands for maintenance of the stepper S are also stored in the storage area of the main CPU 11.

The console C is operated by the operator to input commands to the stepper S. The console C has a console CPU 12, a console display 13 having a display screen for displaying various input or output data in predetermined forms, and a hard disk drive (HDD) storage unit 14 for storing a multiplicity of commands for the stepper S including the maintenance commands in a nonvolatile manner as described below.

The display screen of the console display 13 is of a touch panel type such that when a particular area of the screen is touched by the operator, a command or a process displayed in the particular area is executed in the CPU 12. By processing started in this manner, the console CPU 12 sends operation instructions and data to the console display 13 or the HDD storage unit 14 to control the operation of the same, or communicates with the main CPU 11 in the stepper S to conduct the designated operation. If necessary, the console CPU 12 operates for management of upper computers, e.g., those of a plurality of stepper systems or for exchange of data with a host computer for management of a semiconductor factory. If the console CPU 12 has, for example, a mouse system and is capable of selecting a particular area of the screen of the console display 13, it is not necessary for the console display 13 to have a touch panel screen.

The procedure of setting maintenance commands and the procedure of management and execution of maintenance of the stepper S, representing the procedure of setting commands and the procedure of processing management and execution in this embodiment, will next be described. In this embodiment, maintenance commands using measuring functions of the apparatus (stepper S) itself, necessary for maintenance, are provided in the main CPU 11, as mentioned above. The measuring functions of the apparatus itself, explained below, are measuring functions of the laser interferometer 7, the focus detection system 8a, 8b, the TTR alignment detection system 9a, 9b and the non-TTR alignment detection system 10, and well-known measuring functions achieved by combining the functions of these systems and drive of other units in the stepper S. However, these functions, as well as the corresponding maintenance commands, are only examples and other functions and maintenance commands are, of course, possible.

Combinations of commands described below with respect to this embodiment are set and executed by the console CPU 12. Accordingly, processing described below with reference to each flowchart in the accompanying drawings is performed by the console CPU 12, unless otherwise noted. Displayed pictures shown in the accompanying drawings each represent pictures displayed in a window on the console display 13. On the basis of a command from the console CPU 12, each of these pictures is displayed alone in a window at an arbitrary position on the console display 13, in a pop-up fashion, or simultaneously with one or more other window pictures in a state of overlapping or being parallel with each other.

Figure 6:
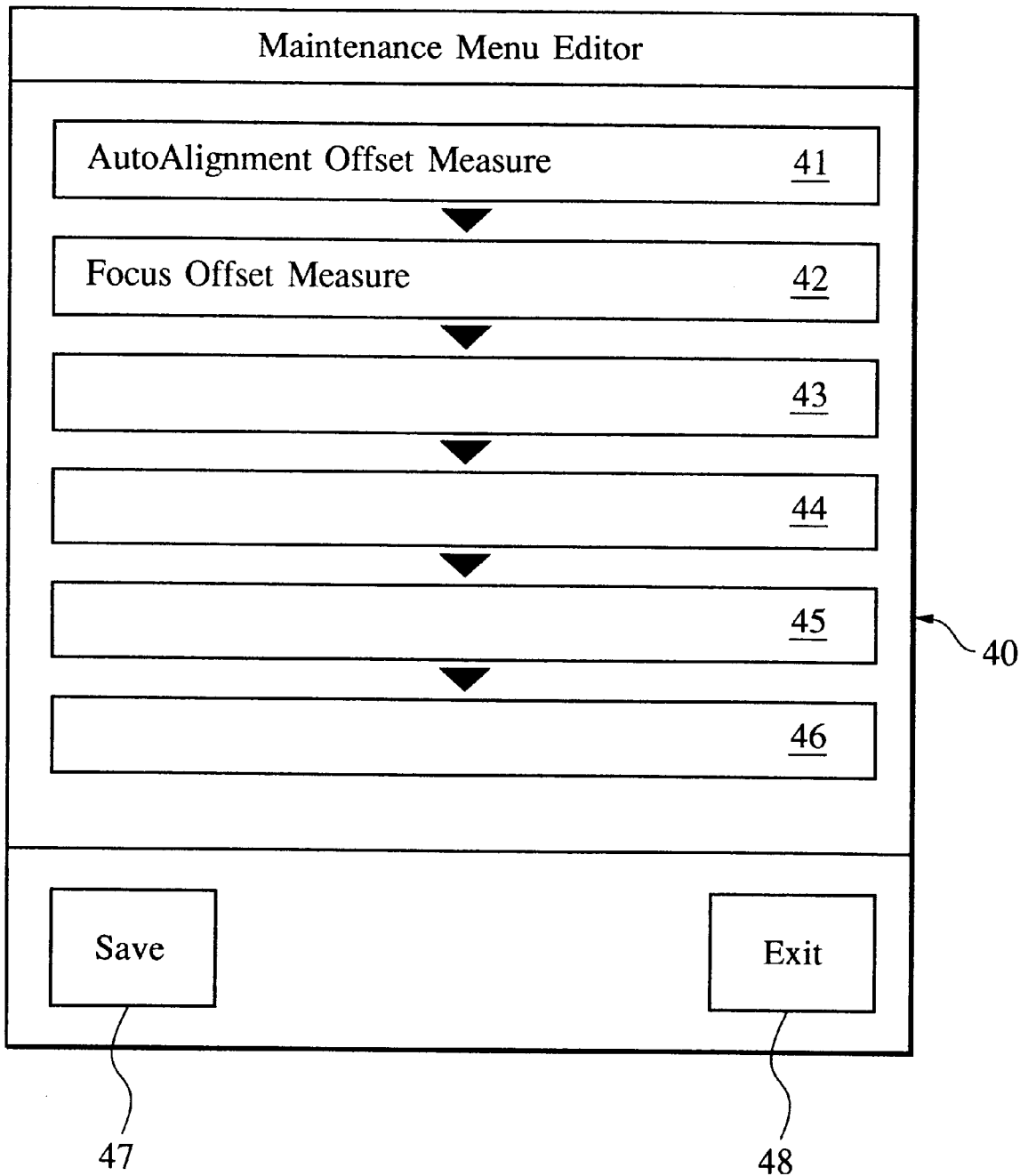
FIG. 6 is a diagram showing a displayed configuration of a maintenance menu editor picture.

In the following description, an array of commands combined in a maintenance menu edit picture such as that shown in FIG. 6 is referred to as a "maintenance menu". A set maintenance menu is stored in the HDD storage unit 14. In this embodiment, a plurality of maintenance menus can be set and stored according to purposes, as described below.

Figure 2:
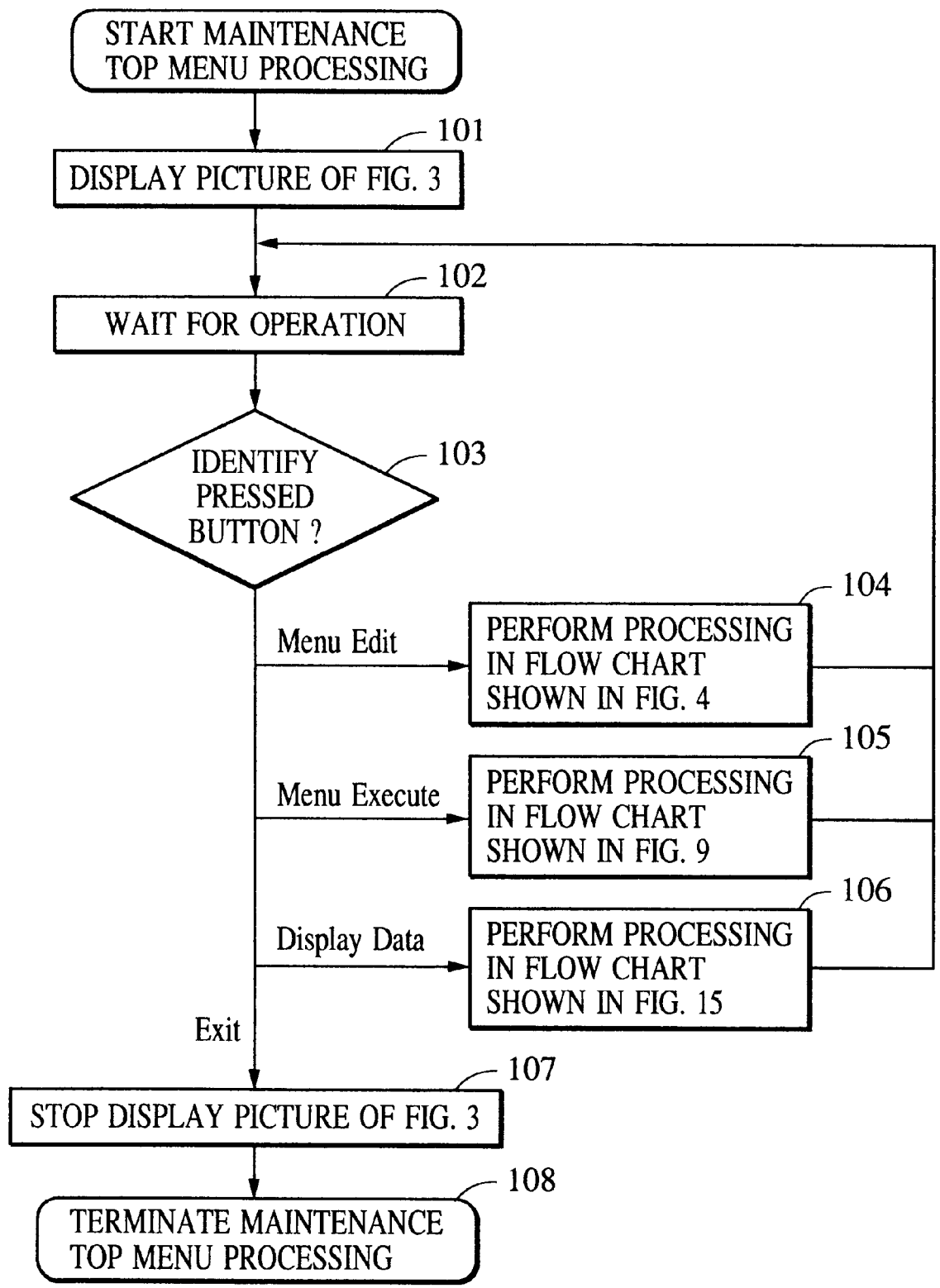
FIG. 2 is a flowchart showing a maintenance process of embodiment of the present invention.

The procedure of setting maintenance commands according to this embodiment will first be described. The operator operates the console C to command the same to perform maintenance processing. Then, the console CPU 12 starts maintenance top menu processing (shown in FIG. 2) and makes a window display of a "Maintenance Top Menu" picture 30 (shown in FIG. 3) on the display screen of the console display 13 (step 101). Then, the next operation of the operator is awaited (step 102). The maintenance top menu picture 30 contains a "Menu Edit" button 31, which is touched by the operator for advancement to a mode of making or editing a group of maintenance commands set in the menu 30, a "Menu Execute" button 32, which is touched for advancement to a mode of making the stepper S execute a group of maintenance commands set in the menu 30, a "Display Data" button 33, which is touched for advancement to a mode of displaying measurement data or the like previously obtained on the display screen of the console display 13, and an "Exit" button 34, which is touched to terminate maintenance processing.

Figures 4, 4A:
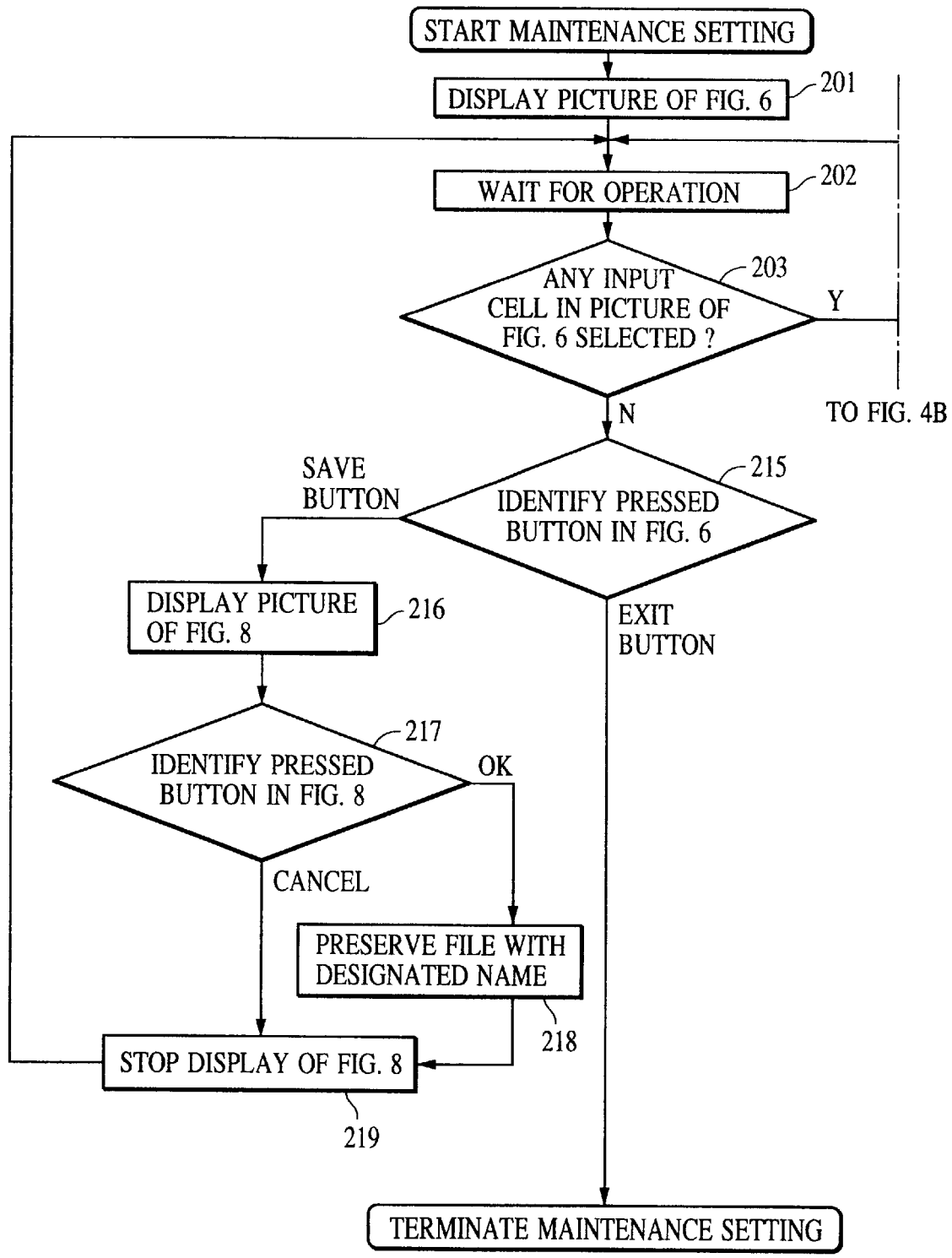
FIG. 4, comprised of FIGS. 4A and 4B, is a flowchart showing a sequence of maintenance menu editing steps.
Figure 9:
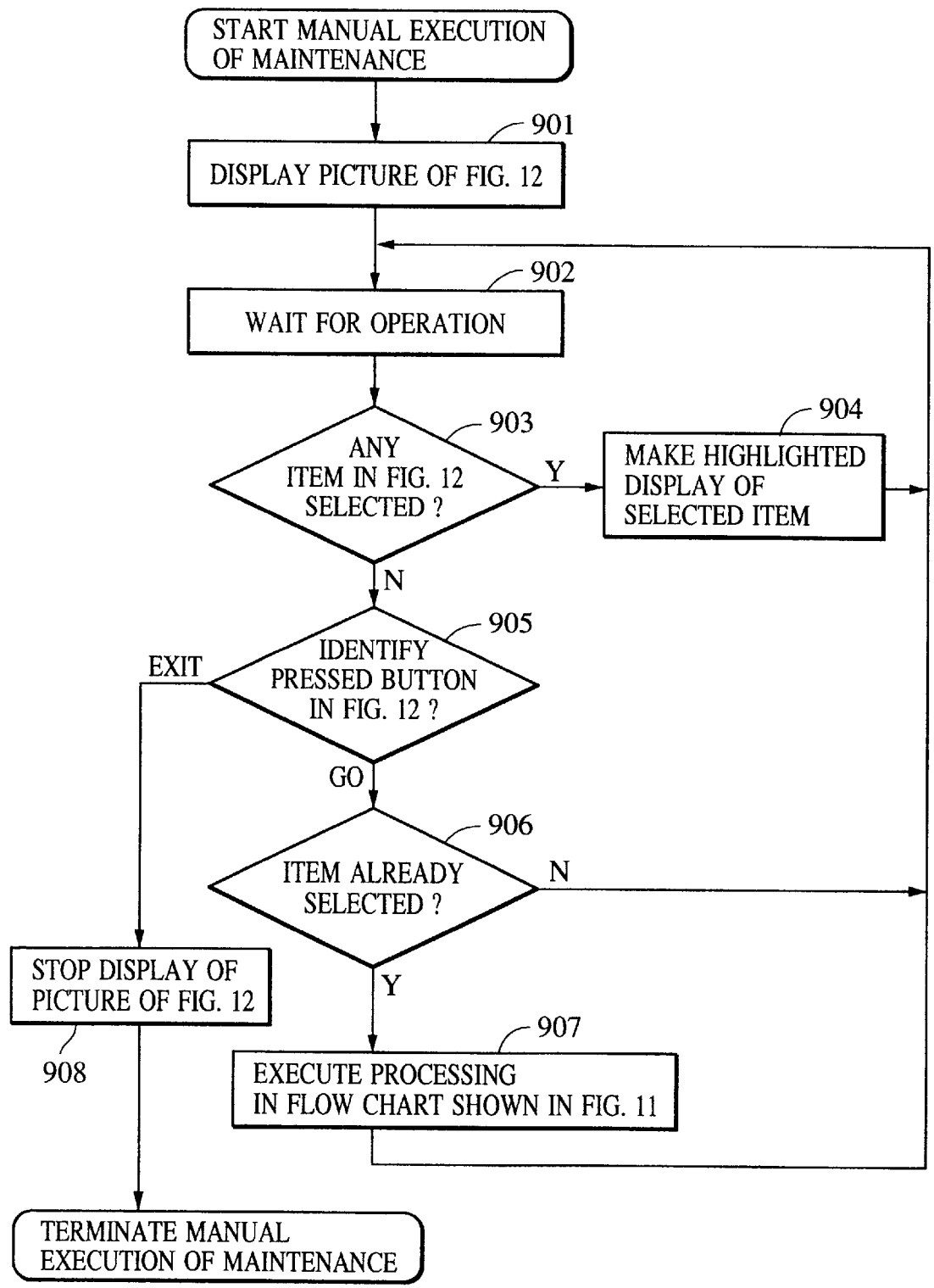
FIG. 9 is a flowchart showing a sequence of maintenance menu manual execution steps.
Figure 15:
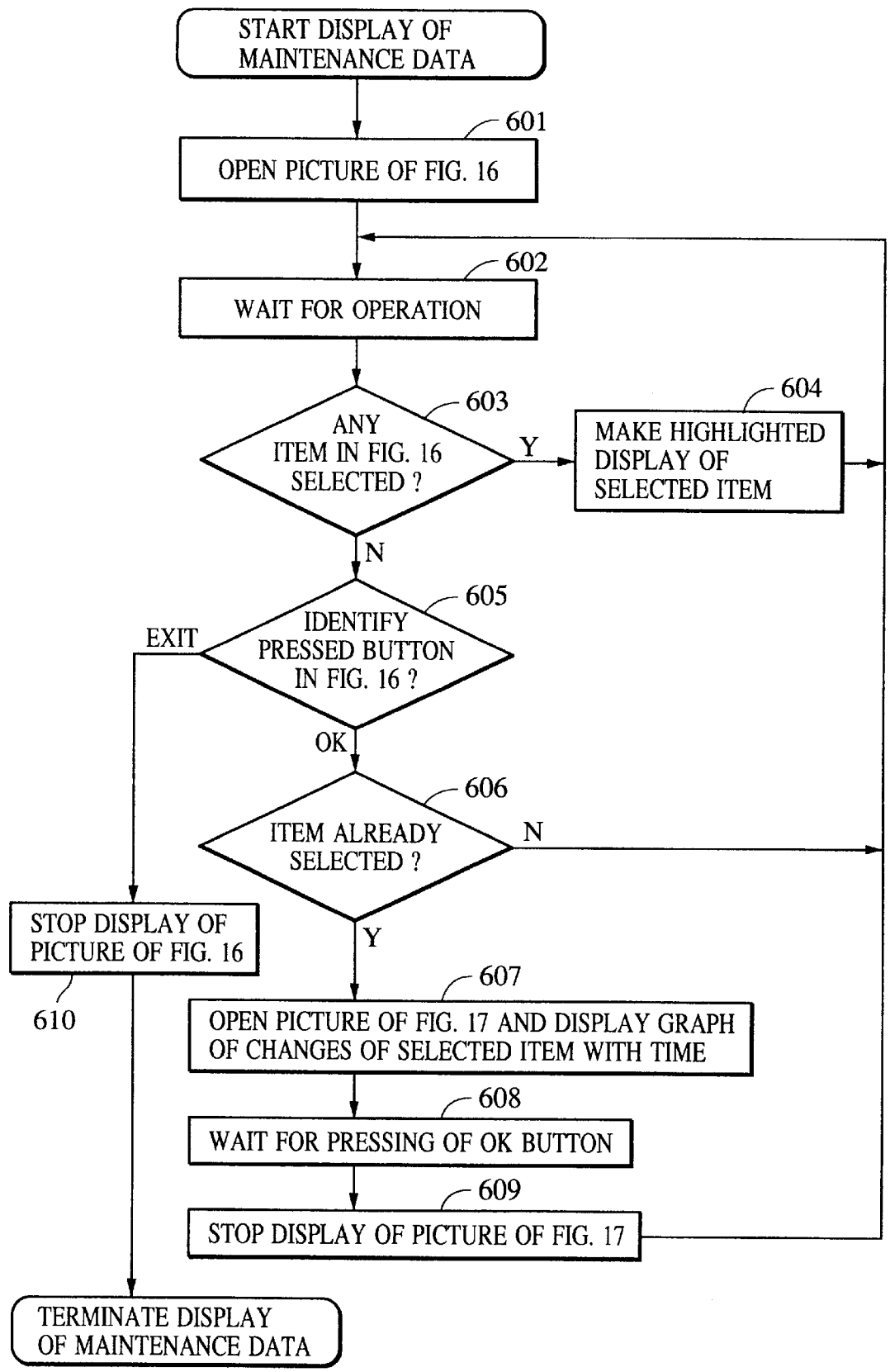
FIG. 15 is a flowchart showing a sequence of maintenance data display processing steps.

If the operator touches the menu edit button 31 for advancement to the mode of making or editing a group of maintenance commands, the console CPU 12 identifies one of the buttons operated (step 103) after the operation awaiting state in step 102. If the operated (touched) button is the menu edit button 31, maintenance setting processing shown in FIG. 4 is performed in step 104. If the operated button is the menu execute button 32, maintenance execution processing shown in FIG. 9 is performed in step 105. If the operated button is the display data button 33, maintenance data display processing shown in FIG. 15 is performed in step 106. Thereafter, the control is set in the operation awaiting state (step 102).

Figure 3:
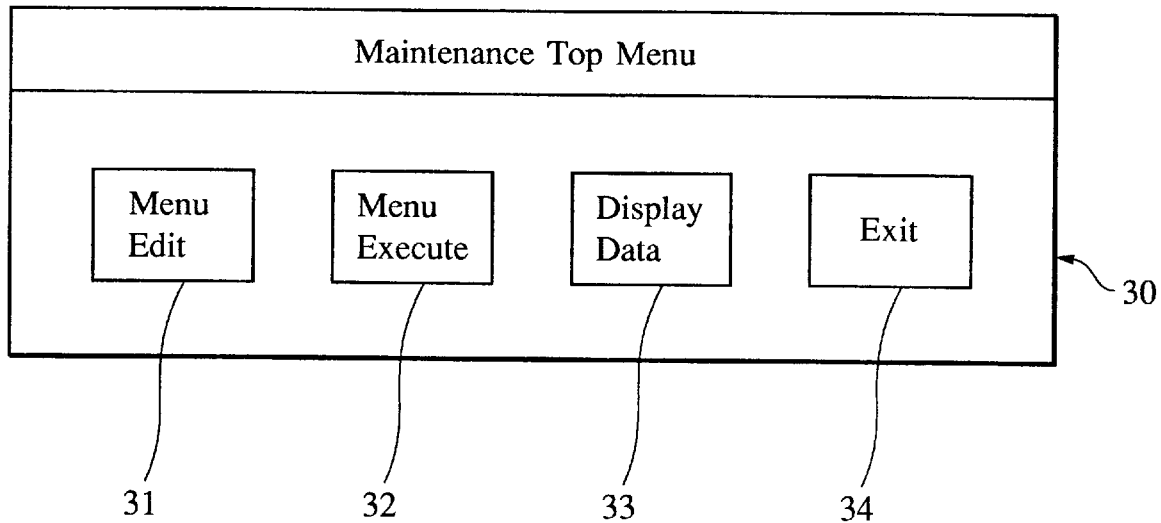
FIG. 3 is a diagram of a window display picture of a maintenance top menu.

If the exit button 34 is operated, the display of the maintenance top menu picture shown in FIG. 3 is stopped by closing the picture window (step 107), and the maintenance top menu processing is terminated (step 108).

When the maintenance setting processing shown in FIG. 4 is started, the console CPU 12 first displays a "Maintenance Menu Editor" picture 40 shown in FIG. 6 in a window on the console display 13 (step 201) and is thereafter set in an operation awaiting state (step 202).

The maintenance menu editor picture 40 shown in FIG. 6 contains a plurality of input cells 41 to 46 for setting maintenance commands in execution order. In each of these cells 41 to 46, one maintenance command is set by the procedure described below. The picture 40 also contains a "Save" button 47, which is touched to store, in the HDD storage unit 14 or the like, the group of maintenance commands set in the cells 41 to 46 as a maintenance command file or maintenance data after naming this group, and an "Exit" button 48, which is operated to terminate maintenance menu editing.

Figure 7:
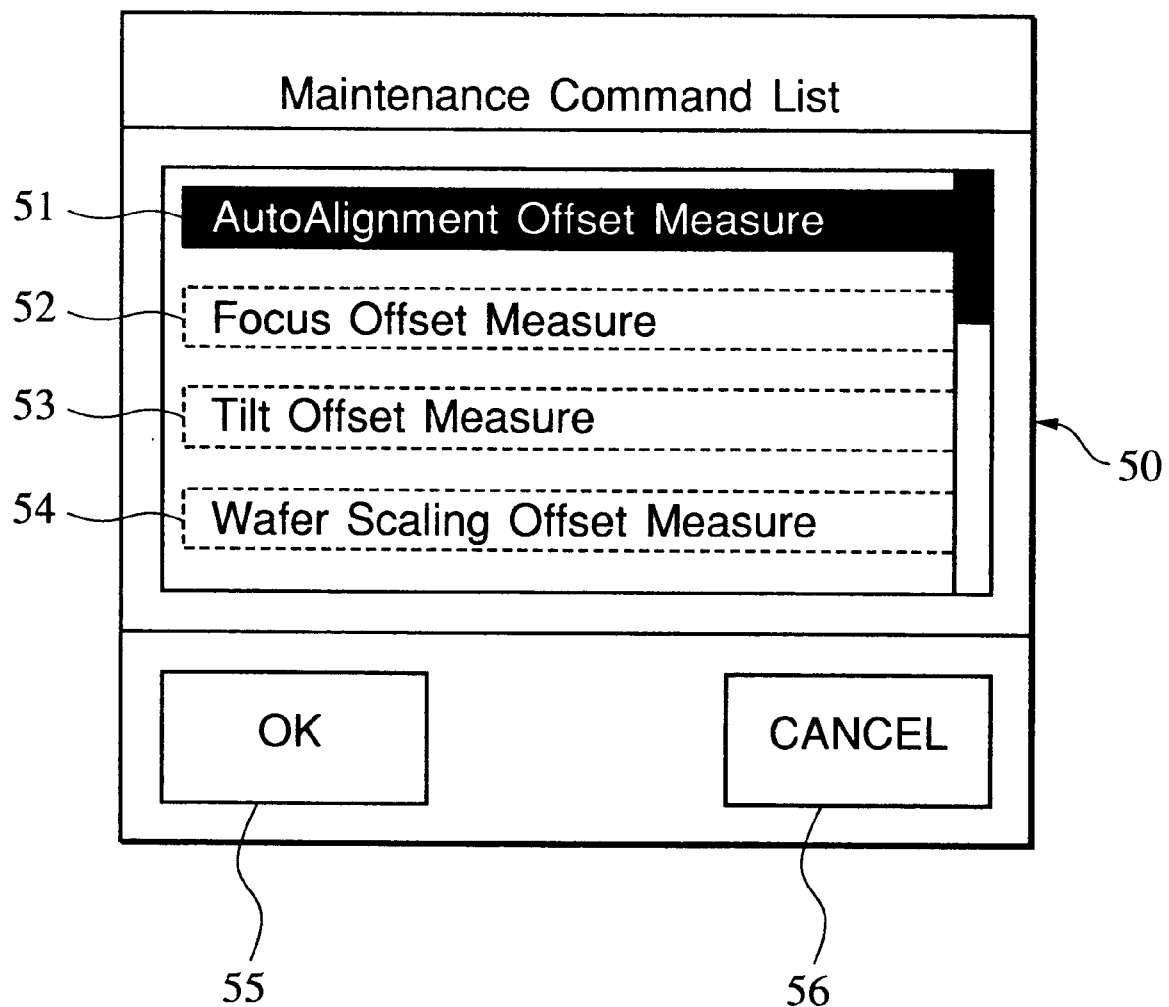
FIG. 7 is a diagram showing a displayed configuration of maintenance command list picture.

If, in the operation awaiting state in step 202 of FIG. 4, the operator selects one of the input cells 41 to 46 shown in FIG. 6 by touching (step 203), that is, the result is Yes, then a determination is made as to whether there is any blank cell, i.e., a cell to which no command has been input, above the selected cell (step 204). If there is a blank cell above the selected cell, that is, in the case of Yes, the process returns to step 202 to again set the control in the operation awaiting state. If there is no blank cell above the selected cell, that is, in the case of No, a "Maintenance Command List" picture 50 shown in FIG. 7 is displayed in a window on the console display 13 to enable a desired one of the multiplicity of maintenance commands to be easily selected (step 205).

The maintenance command list picture 50 has a plurality of display areas 51 to 54 for making such a display that some of a multiplicity of commands, e.g., "AutoAlignment Offset Measure" command, "Focus Offset Measure" command, "Tilt Offset Measure" command, and "Wafer Scaling Offset Measure" command can be selected. The maintenance command list picture 50 also has an "OK" button 55, which is touched to allow a selected command to be set in a selected one of the cells 41 to 46 shown in FIG. 6, and a "CANCEL" button 56, which is touched to close the window display of the maintenance command list picture 50.

The alignment offset measure command is a command for measuring a mount position offset on the projection lens 5 optical axis of the non-TTR alignment detection system 10 shown in FIG. 1. The value of this offset is measured by detecting a plurality of alignment marks (not shown) previously fixed on the wafer stage 6 simultaneously or one after another through the TTR alignment detection system 9a, 9b and the non-TTR alignment detection system 10.

The focus offset measure command is a command for measuring an offset between the actual best focus position of the projection lens 5 and the zero-point position of the focus detection system 8a, 8b for detecting the position of wafer 2 in the Z-direction. This measurement is performed as described below. A mark (not shown) on the reticle 1 is projected on a reflecting area fixed on the wafer stage 6 through the projection lens 5 so that a reflected image from the reflecting area is reimaged on the reticle 1 side, and the contrast of the reimaged mark image is measured by detecting the image through the TTR alignment detection system 9a, 9b. The Z-stage (not shown) in the wafer stage 6 is driven in the Z-direction so that the contrast is optimized. At the Z-stage position at which the contrast is optimized, measurement with the focus detection system 8a, 8b is performed to obtain a detection output from the focus detection system 8a, 8b when the projection lens 5 is at the optimal imaging position. The output value obtained at this time is the value of the offset between the best focus position and the zero-point position of the focus detection system 8a, 8b.

The tilt offset measure command is a command for measuring a tilt offset with respect to the XY-plane of the imaging surface of the projection lens 5. This measurement is performed by executing the above-described focus offset measure command with respect to each of three or more marks which are placed a predetermined distance apart from each other on the reticle 1. The tilt offset of the imaging surface is obtained from the differences between the measured values from the focus detection system 8a, 8b with respect to the best focus positions at these marks.

The wafer scaling measure command is a command for measuring magnification offsets in the X- and Y-directions of the wafer stage 6. This measurement is performed by using a wafer 2 onto which the patterns have already been transferred and on which the magnification of the patterns is known, and by measuring, with the laser interferometer 7, the amount of movement of the wafer stage 6 when at least two marks placed on the wafer 2 at a predetermined distance apart from each other are successively detected with the non-TTR alignment detection system 10. The wafer magnification is obtained on the basis of the ratio of the amount of actual movement of the wafer stage 6 measured with the laser interferometer 7 and the known mark distance on the wafer 2.

Thereafter, when a wafer 2 is actually exposed to the image of the patterns of the reticle 1 by operating the stepper S, the offset values measured by these maintenance commands are used as offset values with respect to the values of detection outputs from the laser interferometer 7, the focus detection system 8a, 8b, the TTR alignment detection system 9a, 9b and the non-TTR alignment detection system 10 to correct the detection output values to accurate values.

Referring back to FIG. 4, after the display of the maintenance command list picture 50 shown in FIG. 7 has been started in step 205, command consistency checking is performed, items (maintenance commands) not selectable by the operation at the present time in the multiplicity of maintenance commands displayed in the maintenance command list picture 50 are set, and the maintenance commands selectable and the maintenance commands not selectable are displayed in different states in the maintenance command list picture 50 (step 206). For example, the selectable maintenance commands and the nonselectable commands may be indicated by solid and broken lines, respectively, or may be displayed in different colors or shapes. Also, regions surrounding the command names may be differentiated in color or shape.

Figure 5:
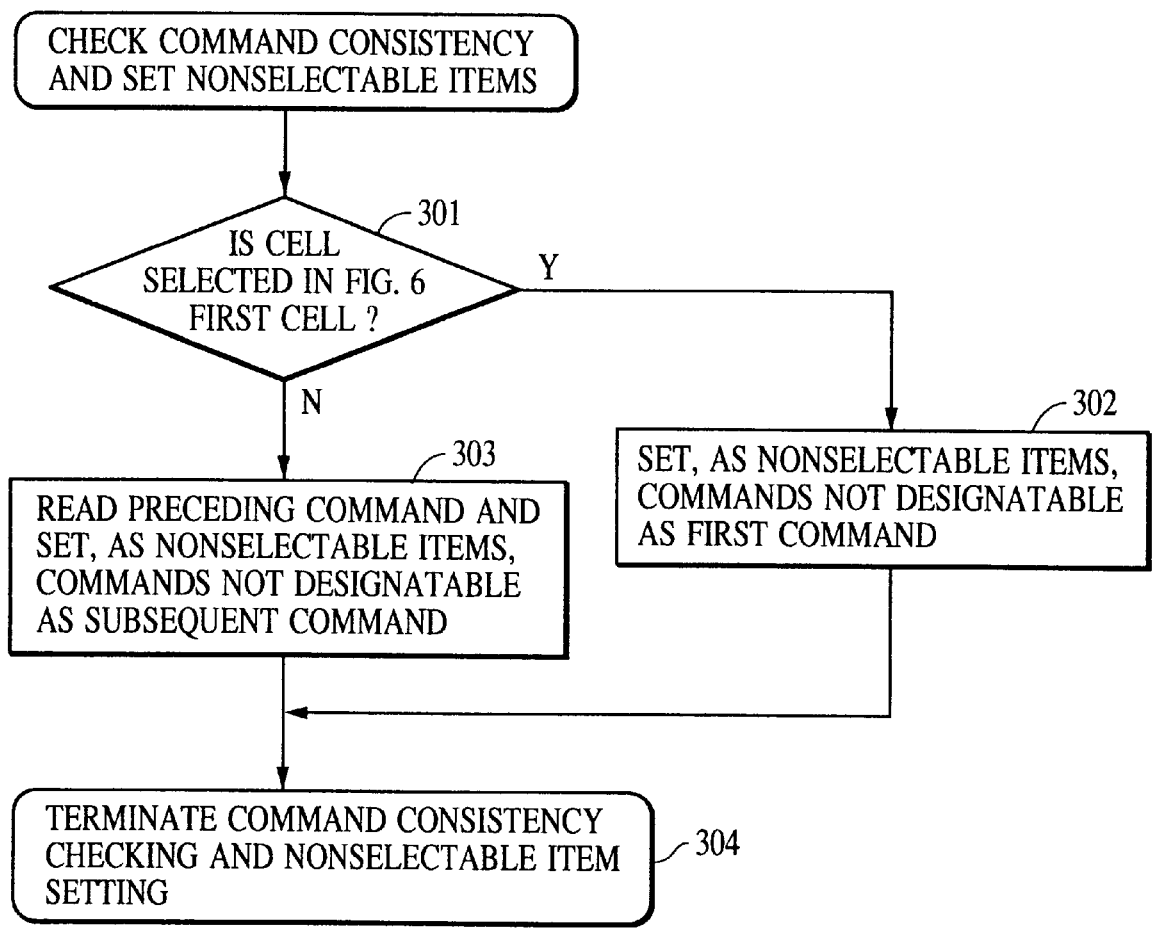
FIG. 5 is a flowchart showing a sequence of maintenance command consistency checking steps.

Command consistency checking in step 206 is executed in accordance with the flows shown in FIG. 5. When command consistency checking is started, a determination is first made as to whether one command input cell selected in the maintenance menu editor picture 40 shown in FIG. 6 is the first cell (step 301). If the selected cell is the first (top) cell, that is, in the case of Yes, the commands in the maintenance command list picture of FIG. 7 not designatable as the first command are displayed in the maintenance command list picture 50 with an indication that they cannot be selected (step 302), and then, the command consistency checking is terminated (step 304). If it is determined in step 301 that the selected cell is not the first cell, that is, in the case of No, the maintenance command input and set in the preceding cell is read to determine the commands which cannot be input and set in the present cell (step 303). The nonselectable maintenance commands thereby determined are displayed in the maintenance command list picture 50 with an indication that they cannot be selected, as in the above, and then, the command consistency checking is terminated (step 304).

Returning to FIG. 4B, after the completion of command consistency checking of step 206, the console CPU 12 is set in the operation awaiting state (step 207). If, in this state, one of the commands (items) displayed in the maintenance command list 50 of FIG. 7 is selected by the operator (step 208), a determination is made as to whether the selected command (item) is selectable by the present operation (step 209). If it is not a selectable command (item), no operation is executed and the control returns to the operation awaiting state in step 207. On the other hand, if it is a selectable command (item), the area in which the command (item) is indicated is displayed in a highlighting state like the command area 51 shown in FIG. 7 (step 210). Thereafter, the control returns to the operation awaiting state in step 207.

If, in the operation awaiting state in step 207, the cancel button 56 is operated by the operator without command selection in step 208 (step 211), the console CPU 12 stops displaying the maintenance command list picture 50 of FIG. 7 on the display 13 by closing the picture window, and the process returns to the operation awaiting state in step 202 (step 214).

If, in this state, the OK button 55 is operated while the cancel button 56 is not operated in step 211, a determination is made as to whether a selection passed by step 209 has been made. If no such selection has been made, the control returns to the operation awaiting state in step 207. If such a selection has been made, the name of the maintenance command selected in step 209 is displayed in the maintenance menu editor picture 40 of FIG. 6 (step 213).

Thereafter, the display of the maintenance command list picture 50 of FIG. 7 on the display 13 is stopped by closing the picture window in step 214 and the control returns to the operation awaiting state in step 202. By the above-described processing, some of the commands displayed in the maintenance command list picture 50 shown in FIG. 7 are displayed in the cells 41 to 46 of the maintenance menu editor picture 40 of FIG. 6 in the order in which they will be executed.

Figure 8:
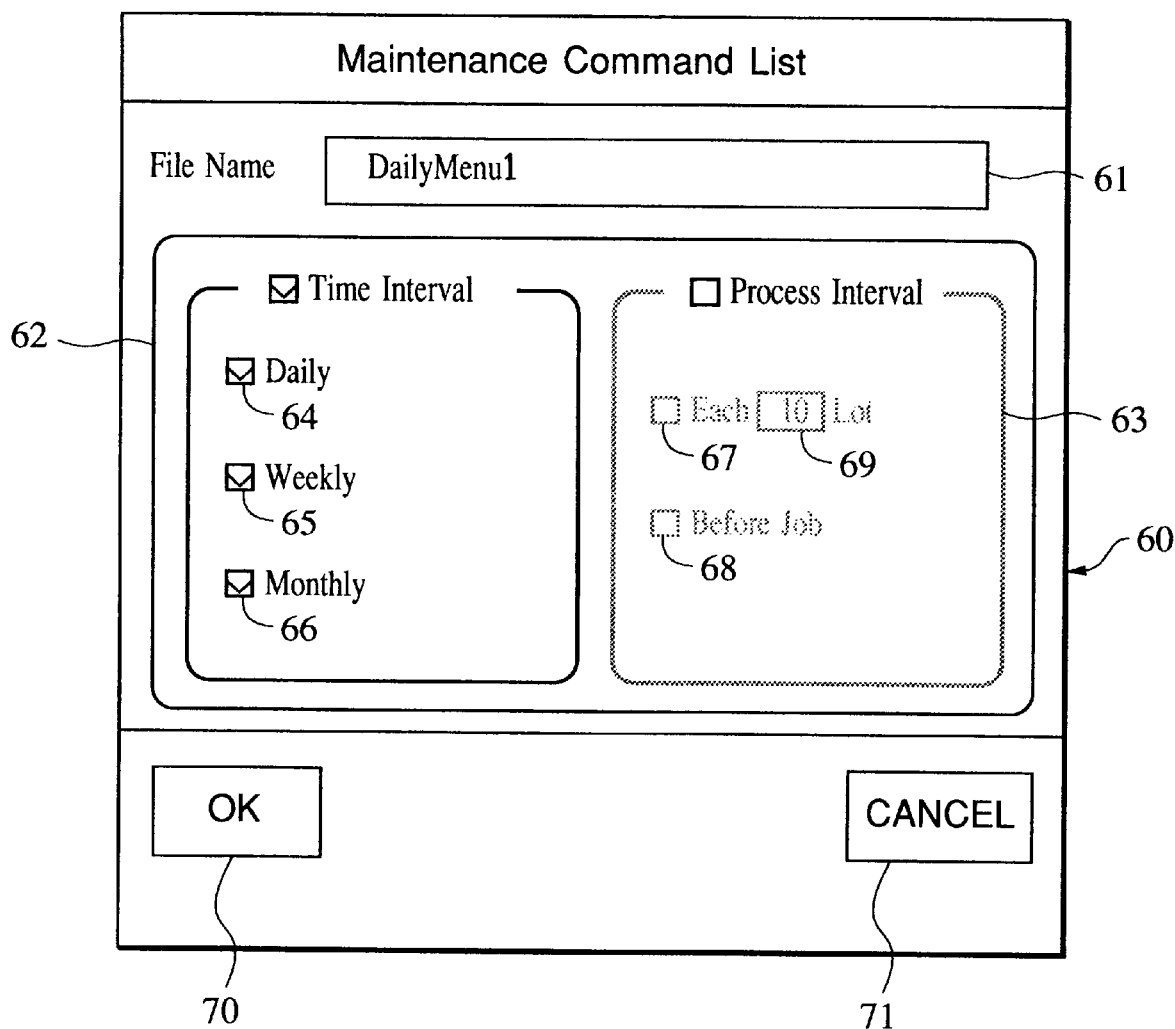
FIG. 8 is a diagram showing a displayed configuration of a maintenance menu save picture.

If, in the operation awaiting state in step 202, the exit button 48 or save button 47 is operated without cell selection in the maintenance menu editor picture 40 in step 203, then the console CPU 12 identifies the operated one of these buttons (step 215). If the operated button is exit button 48, the display of the maintenance menu editor picture 40 of FIG. 6 on the display 13 is stopped by closing the picture window, and the maintenance setting is terminated. If the operated button is save button 47, a "Maintenance Menu Save" picture 60 shown in FIG. 8 is displayed in a window on the display 13 (step 216).

The maintenance menu save picture 60 contains a "File Name" input box 61 for naming a series of maintenance commands edited in the maintenance menu editor picture when the series of maintenance commands is stored as a maintenance menu in the HDD storage unit 14 as described above, and a "Time Interval" check box 62 and a "Process Interval" check box 63 for designating a time interval and a process interval at which the operations in accordance with the maintenance menu will be performed.

In the time interval check box 62, a "Daily" check box 64, a "Weekly" check box 65 and "Monthly" check box 66 are provided to enable selection of an execution period for daily execution, weekly execution or monthly execution according to the use of a stored maintenance menu. In the process check box 63, an "Each X Lot" check box 67 and a "Before Job" check box 68 are provided to set execution times by a predetermined lot number or before a predetermined job during operation of the apparatus according to the use of a stored maintenance menu. The Each X Lot check box 67 is provided with an input box 69 for setting a lot number.

The check boxes 64 to 66 in the time interval check box 62 and the check boxes 67 to 69 in the process interval check box 63 are displayed in such a manner that when one of the time interval check box 62 and the process interval check box 63 is selected, the selected one of these boxes is indicated by a solid line while the other is indicated by a broken line, thereby preventing an error in selecting the subordinate check boxes.

The maintenance menu save picture 60 further contains a "CANCEL" button 71, which is touched (operated) by the operator when maintenance menu storing is stopped and when the display of picture 60 is stopped by closing the window, and an "OK" button 70, which is touched (operated) when a maintenance menu, the contents of which are set in the maintenance menu save picture 60, is stored in the HDD storage unit 14. Storing or saving of a maintenance menu in this process step may be registered in a data base or the like as well as stored in a simple file form.

When the OK button 70 or the cancel button 71 is operated after the display of the maintenance menu save picture 60 of FIG. 8 has been started, the operated button is identified (step 217). If the operated button is cancel button 71, the display of the maintenance menu save picture 60 on the display 30 is stopped by closing the window and the control returns to the operation awaiting step in step 202. If the operated button is OK button 70, the series of maintenance commands made by the above-described processing, i.e., a maintenance menu, is stored in the HDD storage unit 14 (step 218). At this time, the contents checked in the check boxes 62 to 69 are simultaneously stored.

When storing of a maintenance menu is completed in step 218, the display of the maintenance menu save picture 60 on the display 30 is stopped by closing the window (step 219) and the control returns to the operation awaiting step in step 202. Thereafter, if a new maintenance menu is made, the above-described process steps are repeated. If the maintenance menu setting is terminated, the exit button 48 shown in FIG. 6 is operated in step 215 of FIG. 4.

The operation at the time of starting maintenance manual execution processing shown in FIG. 9 will next be described. This processing is started by operating the menu execution button 32 in the maintenance top menu 30 of FIG. 3 to make the stepper S execute one of the maintenance menus stored in the HDD storage unit 14.

Figure 12:
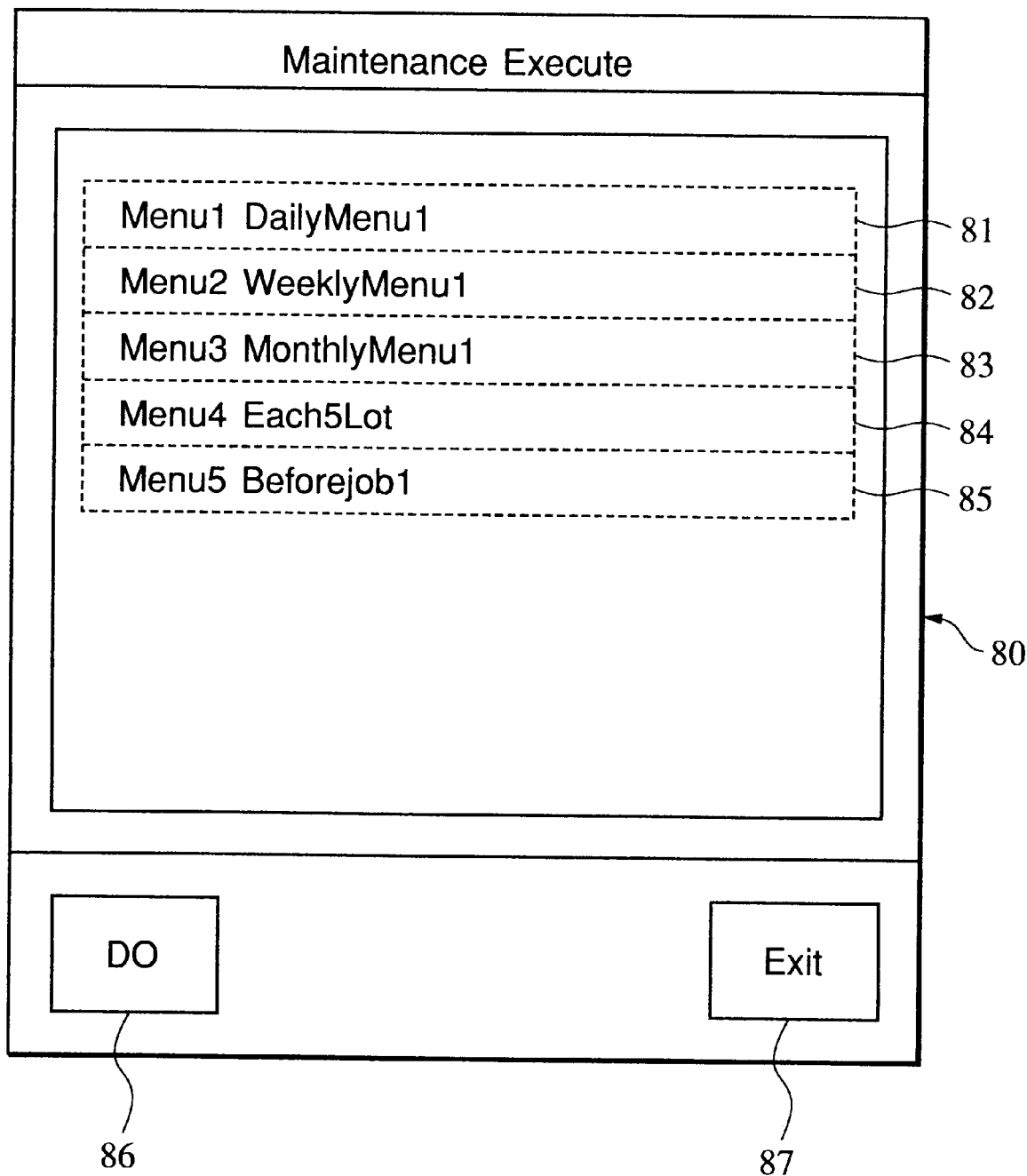
FIG. 12 is a diagram showing a displayed configuration of a maintenance execute picture.

Each of the maintenance menus stored in the HDD storage unit 14 is executed by using a "Maintenance Execute" picture 80 shown in FIG. 12. Accordingly, when maintenance manual execution processing shown in FIG. 9 is started, the maintenance execute picture 80 is first displayed in a window on the console display 13 (step 901). In this state, the control is set in the operation awaiting state (step 902).

In the maintenance execute picture 80, to enable maintenance menus 81 to 86 to be selected according to one's purpose from the maintenance menus stored in the HDD storage unit 14, maintenance menus 81 to 85 stored in the HDD storage unit 14 are displayed with their file names (Menu 1 to Menu 5) with an indication of execution periods set at the time of storing (DailyMenu 1, WeeklyMenu 1, MonthlyMenu 1, Each5Lot, BeforeJob 1). In the maintenance execute picture 80, a "DO" button 86, which is operated when a maintenance menu selected from the group of menus displayed is executed, and an "Exit" button 87, which is operated when the maintenance manual execution processing is terminated, are also provided.

In this maintenance menu execution, a selected maintenance menu functions to control the operation of the stepper S as if the menu is a single command. That is, a multiplicity of maintenance commands combined to form a maintenance menu are successively executed.

Referring back to FIG. 9, if it is recognized that one of the maintenance menus (items) 81 to 85 shown in the maintenance execute picture 80 of FIG. 12 is selected in the operation awaiting state in step 902 (step 903), the selected maintenance menu (item) is displayed in a highlighted state in the maintenance execute picture 80 (step 904). The control is again maintained in the operation awaiting state in step 902 until the do button 86 or the exit button 87 in the maintenance execute picture 80 is operated.

If the do button 86 or the exit button 87 is operated, and if the result of step 903 is "No", the operated button is identified (step 905). If the operated button is do button 86, a determination is made as to whether a maintenance menu (item) has been selected in the maintenance execute picture 80 (step 906).

Figure 11:
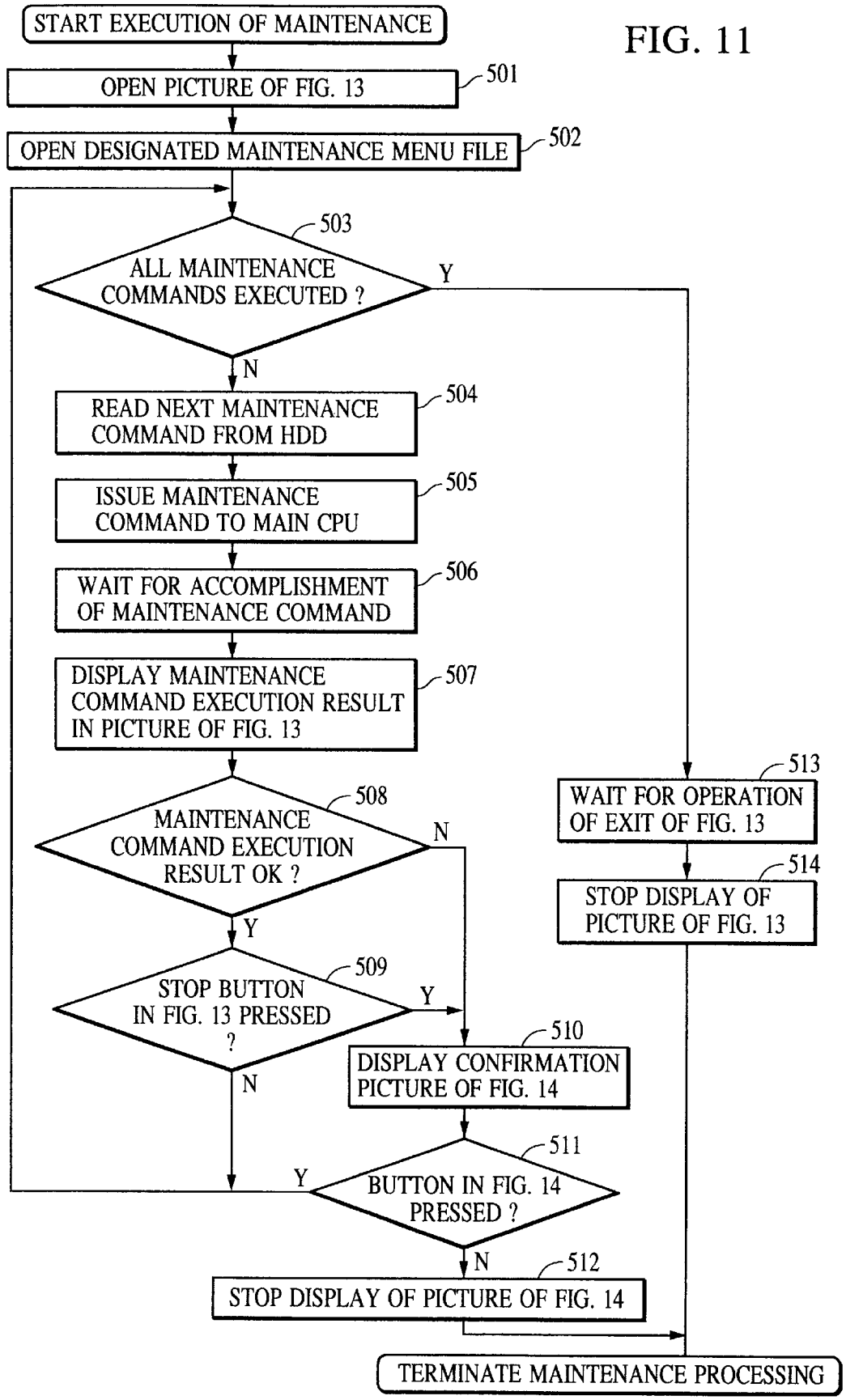
FIG. 11 is a flowchart showing details of the sequence of maintenance menu execution steps.

If a maintenance menu (item) has been selected, the stepper S is made to execute the maintenance menu (item) in accordance with the steps in the flow chart shown in FIG. 11 (step 907). Thereafter, the control returns to the operation awaiting state in step 902. If no maintenance menu has been selected, the control returns directly from step 906 to the operation awaiting state in step 902.

On the other hand, if the operated button identified in step 905 is the exit button, the display of the maintenance execute picture 80 of FIG. 12 on the console display 30 is stopped by closing the window (step 908), and the maintenance manual execution processing is terminated.

Figure 13:
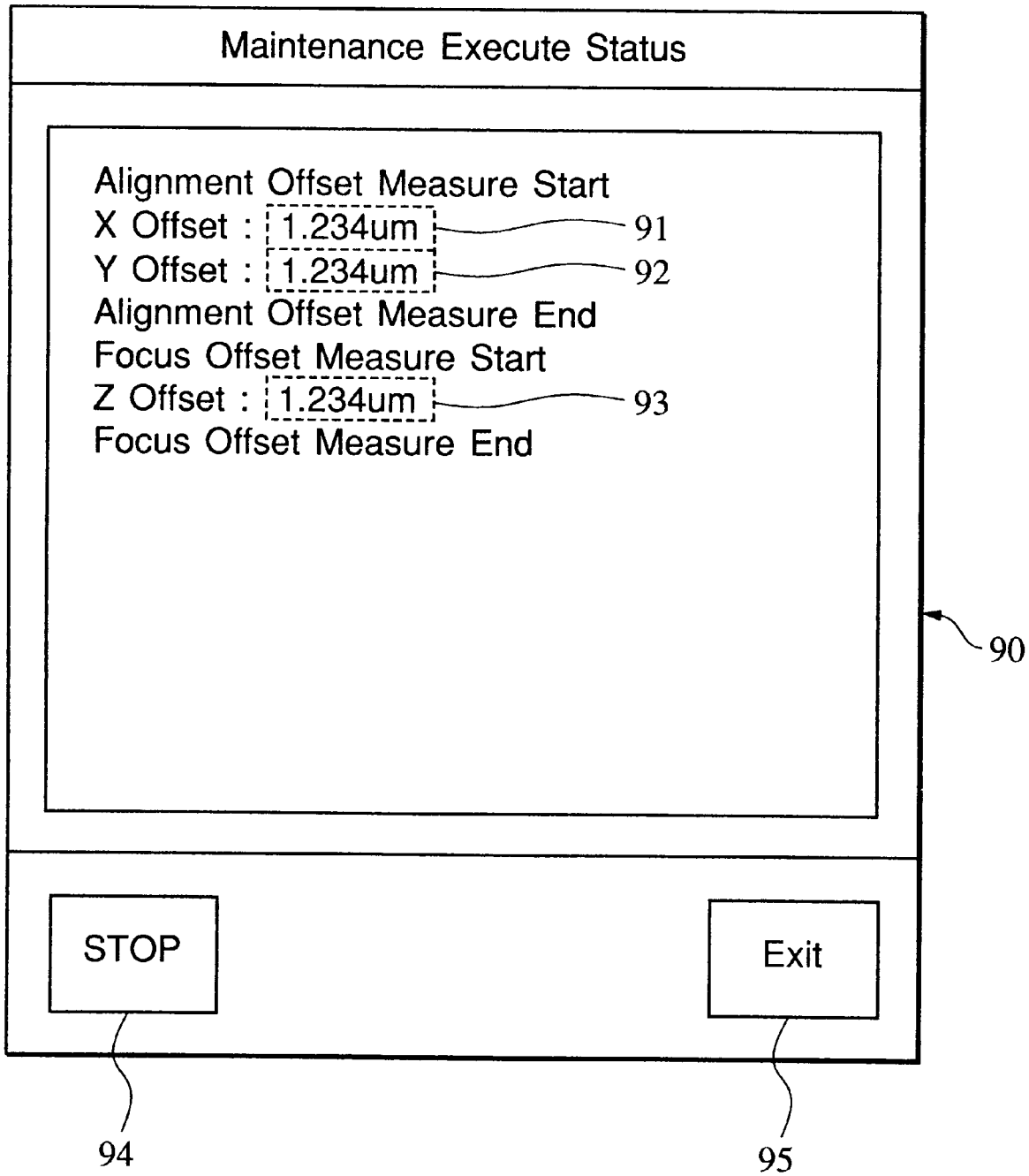
FIG. 13 is a diagram showing a displayed configuration of a maintenance execute status picture.

If the maintenance execution routine shown in FIG. 11 is started in step 907, a "Maintenance Execute Status" picture 90 shown in FIG. 13 is displayed in a window on the console display 13 (step 501). In the maintenance execute status picture 90, when the maintenance commands in the selected maintenance menu are executed successively, the starts and ends of the commands are displayed in the execution order and measurement results obtained by execution of each command are displayed in a real time manner.

FIG. 13 indicates that measurement in accordance with the alignment offset measure command was started and finished and shows the results of this measurement: an offset 91 in the X-direction (X Offset) of 1.234 $\mu$m, and an offset 92 in the Y-direction (Y Offset) of 1.234 $\mu$m. FIG. 13 also indicates that, after the completion of the measurement in accordance with the alignment offset measure command, measurement in accordance with the focus offset measure command was started, an offset 93 in the Z-direction (Z Offset) of 1.234 $\mu$m was obtained, and the measurement was finished. New contents are added to this display each time one of the commands in the maintenance menu is executed.

In the maintenance execute status picture 90, a "STOP" button 94, which is operated when execution of a maintenance menu is temporarily stopped, and an "Exit" button 95, which is operated when execution of a maintenance menu is terminated, are provided.

Referring back to FIG. 11, after the maintenance execute status picture 90 has been opened in step 501, the file of a maintenance menu selected in the maintenance execute picture 80 of FIG. 12 is taken out from the group of maintenance menus stored in the HDD storage unit 14 and is opened in a memory such as a random access memory in the console CPU 12 (step 502). Thereafter, a check is made as to whether all the maintenance commands in the selected maintenance menu have been executed (step 502). If all the maintenance commands have been executed, operation of the exit button 95 is awaited. When the exit button 95 is operated (step 513), the display of the maintenance execute status picture 90 is stopped by closing the window, and the maintenance processing is terminated.

If execution of all the maintenance commands has not been completed, the next maintenance command according to the selected maintenance menu is read out (step 504). Then, the maintenance command read out is issued to the main CPU 11 of the stepper S (step 505). The main CPU 11 controls the operation of the stepper S according to the issued maintenance command. Completion of the measuring processing according to the issued maintenance command on the main CPU 11 side is awaited (step 506).

When the processing of the main CPU 11 in accordance with the issued maintenance command is completed and when the console CPU 12 is informed of the result of execution of the maintenance command as well as measured values, the console CPU 12 displays the measurement results of the maintenance command as offset values in the maintenance execute status picture of FIG. 13 (step 507). Thereafter, the result of execution of the maintenance command is checked (step 508). If there is no problematic point in the result, confirmation is made as to whether the stop button 94 in the maintenance execution status picture 90 has not been operated (step 509). Thereafter, the process returns to step 503. The above-described sequence of steps is repeated with respect to the maintenance commands set in the maintenance menu selected in the maintenance execute picture 80 of FIG. 12.

Figure 14:
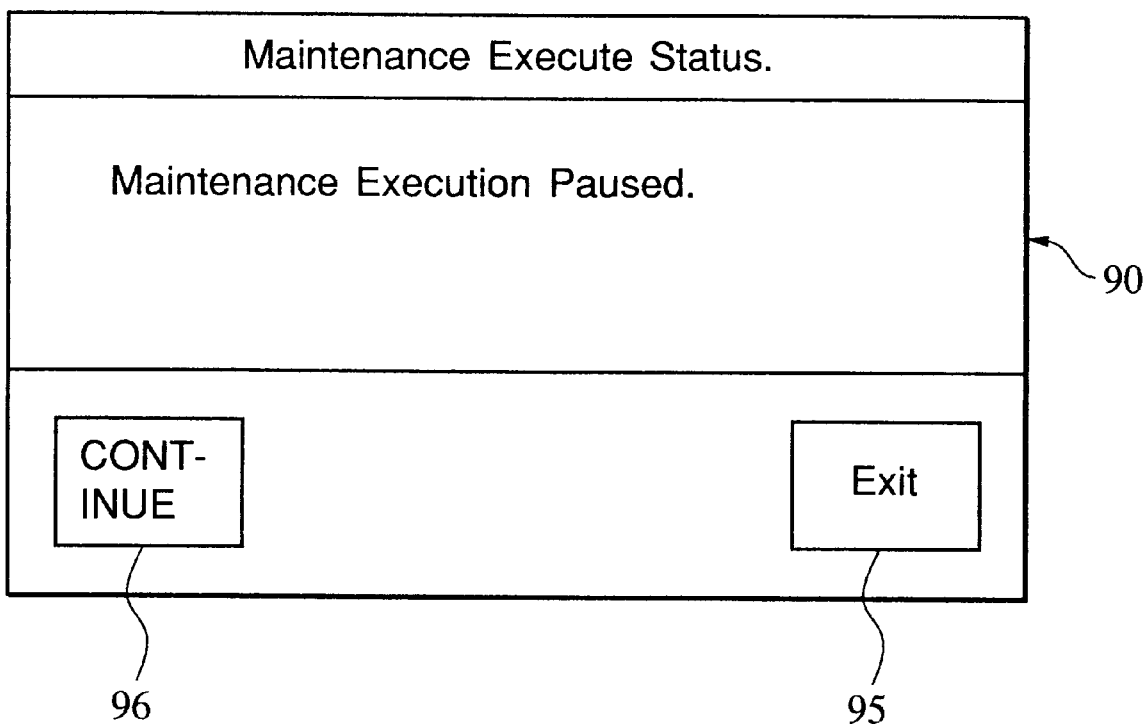
FIG. 14 is a diagram showing a displayed configuration of the maintenance execute status picture in paused state.

If a problematic point is recognized in the maintenance execution result in step 508, or if it is recognized in step 509 that the stop button 94 in the maintenance execute status picture 90 has been operated, the display of the maintenance execute status picture 90 is changed to "Maintenance Execution Paused" as shown in FIG. 14, and the subsequent processing is stopped (step 510). At the time of this display, the stop button 94 of the maintenance execute status is replaced with a "CONTINUE" button 96. If the continue button 96 is operated (step 511), the process returns to step 503 to repeat the above-described processing for the maintenance commands set in the maintenance menu. If, at this time, the exit button 95 is operated, the display of the maintenance execute status button 90 is stopped by closing the window (step 512), and the maintenance processing is terminated.

It has been said that the maintenance manual execution processing shown in FIG. 9 is started by operating the menu execute button 32 in the maintenance top menu 30 shown in FIG. 3 in order to make the stepper S execute a maintenance menu. However, the control system may be arranged so that a maintenance menu is automatically executed according to a command from a host computer ranked higher than the console CPU 12 if the stepper S is operated by on-line control or the like.

Figure 10:
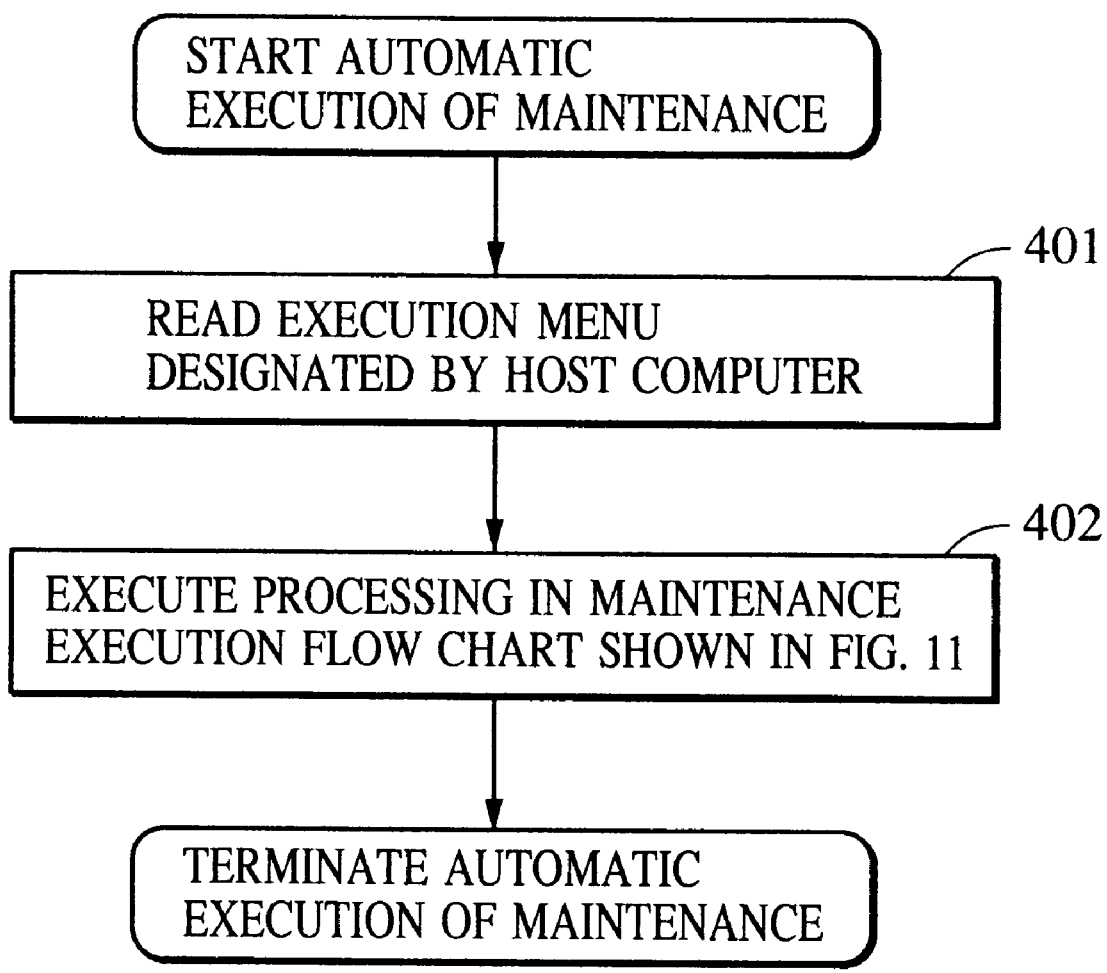
FIG. 10 is a flowchart showing a sequence of maintenance menu automatic execution steps.

FIG. 10 shows a process used in such a case. When the console CPU 12 is instructed by a host computer (not shown) to execute a maintenance menu, the console CPU 12 reads out the designated maintenance menu from the HDD storage unit 14 (step 401) to perform processing in accordance with the maintenance execution steps in the flowchart shown in FIG. 11 (step 402). The contents of the process executed in accordance with the flowchart shown in FIG. 11 are the same as described above and the description of them will not be repeated.

The results of the maintenance menus executed in the above-described manner are accumulated to form record files, which are stored in the HDD storage unit 14. The operation of displaying changes with time in the maintenance results by using such record files will next be described.

Figure 16:
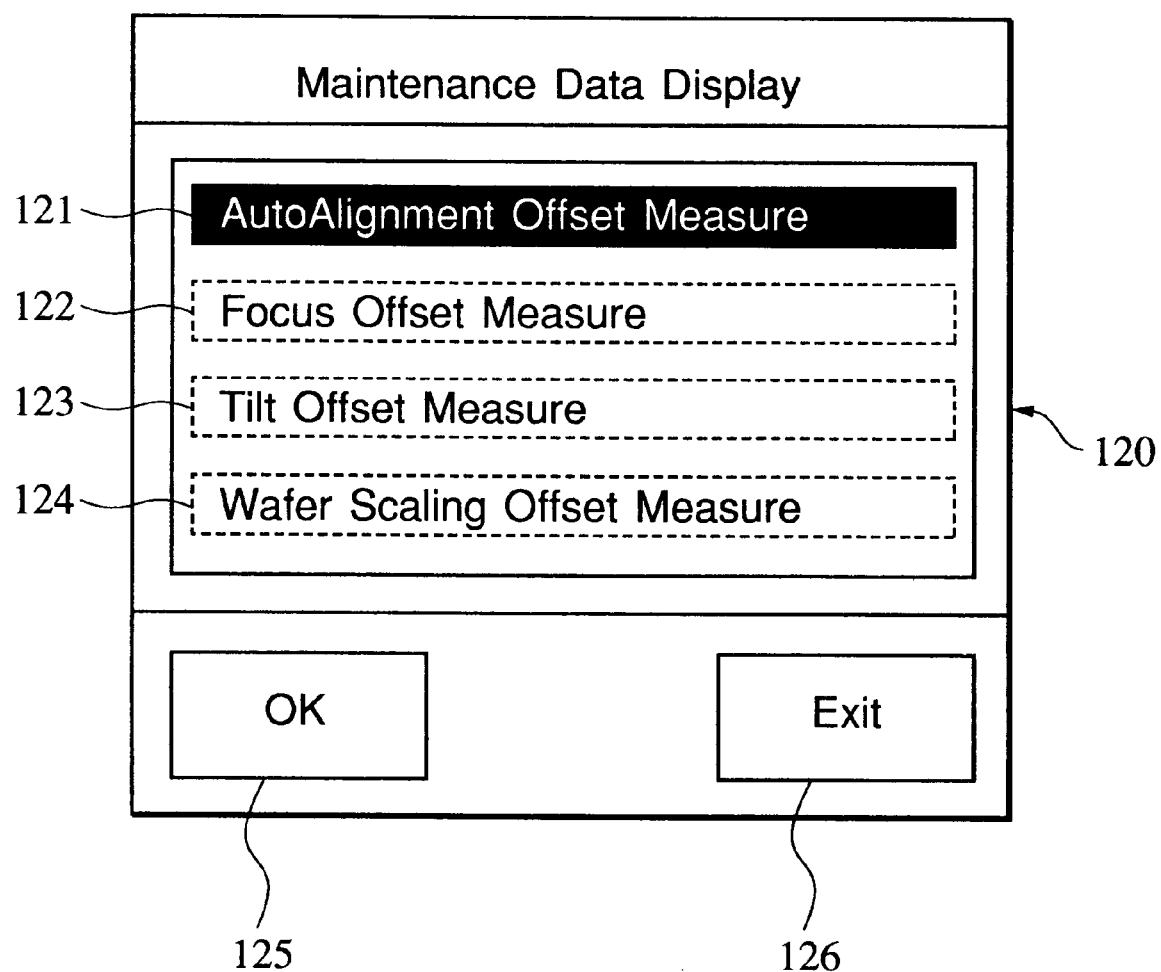
FIG. 16 is a diagram showing a displayed configuration of a maintenance data display picture.

When the data display button 33 of the maintenance top menu 30 of FIG. 3 is operated to start maintenance data display processing shown in FIG. 15, a "Maintenance Data Display" picture 120 shown in FIG. 16 is first displayed in a window on the console display 13 (step 601) and the control is set in the operation awaiting state (step 602).

In the maintenance data display picture 120, the names of commands such as alignment offset measure 121, focus offset measure 122, tilt offset measure 123 and wafer scaling offset measure 124 capable of displaying record data are displayed. The maintenance data display picture 120 has an "OK" button 125, which is operated when record data relating to a selected maintenance command is displayed, and an "Exit" button 126, which is operated when maintenance data display processing is terminated.

Referring to FIG. 15, if it is recognized that one of the maintenance commands (items) 121 to 124 displayed in the maintenance data display picture 120 of FIG. 16 is selected in the operation awaiting state in step 602 (step 603), the selected maintenance command is displayed in a highlighted state in the maintenance data display picture 120 (step 604) and the process returns to the operation awaiting state in step 602.

Figure 17:
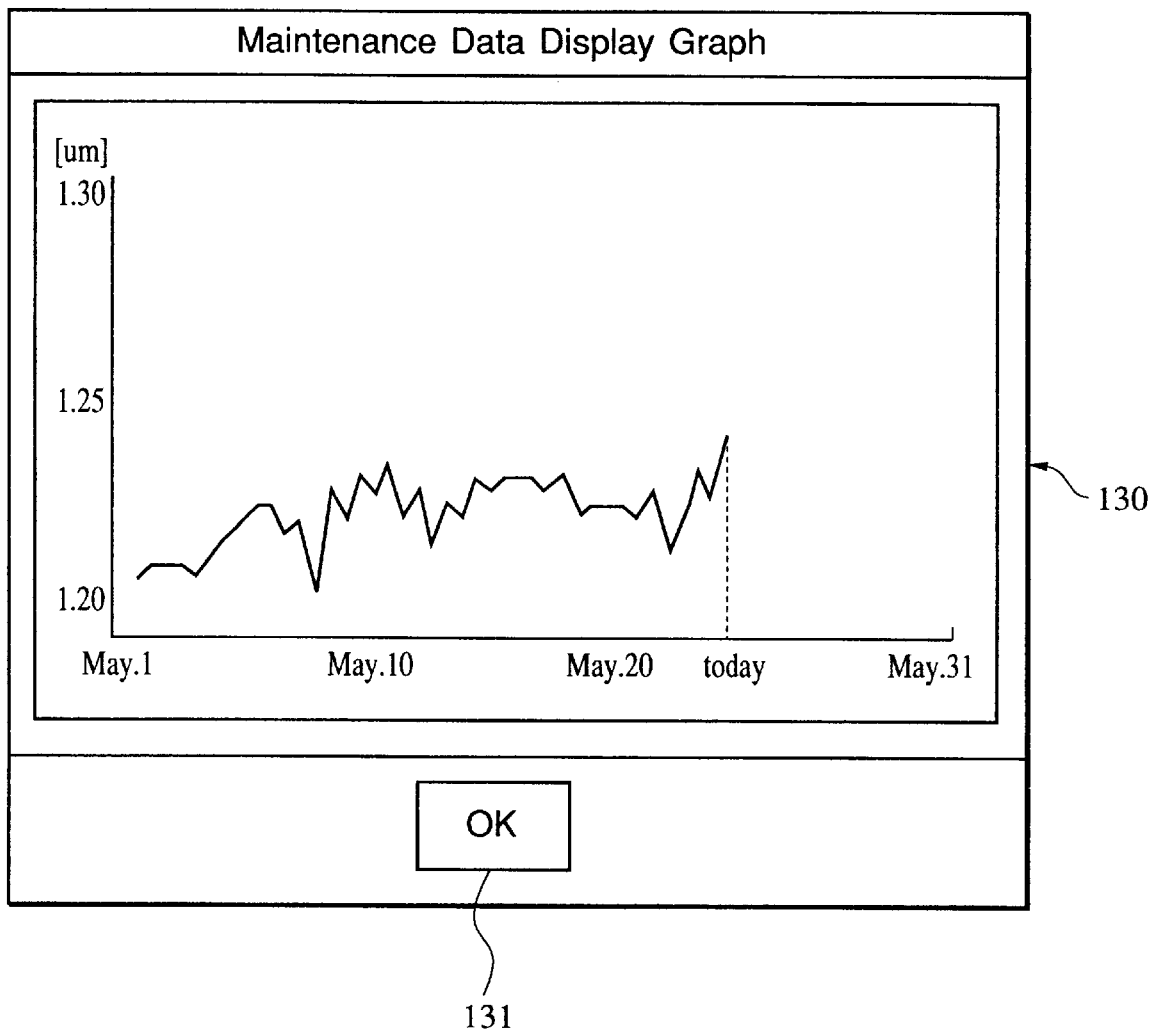
FIG. 17 is a diagram showing a displayed configuration of a maintenance data display graph picture.

If one of the buttons in the maintenance data display picture 120 (step 605), and if the operated button is exit button 126, the display of the maintenance data display picture 120 is stopped by closing the window (step 610) and the maintenance data display processing is terminated. If the operated button is OK button 125, a determination is made as to whether a maintenance command (item) has been selected on the maintenance data display picture 120 (step 606). If no maintenance command (item) has been selected, the process returns to the operation awaiting state in step 602. If a maintenance command (item) has been selected, a "Maintenance Data Display Graph" picture 130 shown in FIG. 17 is displayed in a window on the console display 13. In the picture 130, a graph showing changes with time in the offset value measured by the selected maintenance command (item) is displayed (step 607).

In the maintenance data display graph picture 130, changes in the measured offset value are shown with measurement dates, the abscissa representing dates, the ordinate representing the measured offset value. This graph is used to see changes in each offset value of the stepper S. In the picture 130, "today" is displayed at the point corresponding to the present time. If an "OK" button 131 provided in this picture 130 is operated (step 608), the display of the maintenance data display graph picture 130 is stopped by closing the window (step 609) and the process returns to the operation awaiting state in step 602.

Thus, according to the present invention, it is possible to provide a semiconductor manufacturing apparatus capable of accurate maintenance while constantly maintaining accurate pattern exposure.

Except as otherwise disclosed herein, the various components shown in outline or in block form in the Figures are individually well known and their internal construction and operation are not critical either to the making or using of this invention or to a description of the best mode of the invention.

While the present invention has been described with respect to what presently is considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A semiconductor manufacturing apparatus using a plurality of maintenance commands for automatically measuring errors caused by the apparatus or caused by a wafer treatment process, by using measuring functions of the apparatus, said apparatus comprising:

display means for displaying a list of the plurality of maintenance commands;

console-side control means for enabling an operator to select some of the plurality of maintenance commands displayed by said display means, to generate a maintenance menu in which some of the plurality of maintenance commands are combined as desired by the operator and to edit the maintenance menu;

storage means for storing the maintenance menu generated and edited using said console-side control means; and apparatus-side control means for successively executing the maintenance commands in the maintenance menu stored in said storage means when said apparatus-side control means receives an instruction to execute the maintenance menu.

2. A semiconductor manufacturing apparatus using a plurality of maintenance commands for automatically measuring errors caused by the apparatus or caused by a wafer treatment process, by using measuring functions of the apparatus, said apparatus comprising:

display means for displaying a list of the plurality of maintenance commands;

console-side control means for enabling an operator to select some of the plurality of maintenance commands displayed by said display means, to generate a maintenance menu in which some of the plurality of maintenance commands are combined as desired by the operator and to edit the maintenance menu;

storage means for storing the maintenance menu generated and edited using said console-side control means; and apparatus-side control means for successively executing the maintenance commands in the maintenance menu stored in said storage means when said apparatus-side control means receives an instruction to execute the maintenance menu, wherein said display means displays a plurality of input cells for inputting the maintenance commands constituting the maintenance menu when the maintenance menu is generated, and said console-side control means generates and edits the maintenance menu as the operator alternately selects one of the input cells and one of the maintenance commands in the maintenance command list.

3. An apparatus according to claim 2, wherein said display means differentiates a displayed state of one of the input cells selected at the time of generating the maintenance menu from a displayed state of the unselected input cells.

4. An apparatus according to claim 2, wherein said display means differentiates a displayed state of some of the maintenance commands in the maintenance command list, which are suitable for input to one of the input cells selected at the time of generating the maintenance menu from a displayed state of maintenance commands in the maintenance command list, which are unsuitable for input to the input cell.

5. An apparatus according to claim 2, wherein said display means displays a plurality of maintenance menus stored in said storage means at the time of maintenance menu execution so that one of the maintenance menus can be selected.

6. A semiconductor manufacturing apparatus using a plurality of maintenance commands for automatically measuring errors caused by the apparatus or caused by a wafer treatment process, by using measuring functions of the apparatus, said apparatus comprising:

display means for displaying a list of the plurality of maintenance commands;

console-side control means for enabling an operator to select some of the plurality of maintenance commands displayed by said display means, to generate a maintenance menu in which some of the plurality of maintenance commands are combined as desired by the operator and to edit the maintenance menu;

storage means for storing the maintenance menu generated and edited using said console-side control means; and apparatus-side control means for successively executing the maintenance commands in the maintenance menu stored in said storage means when said apparatus-side control means receives an instruction to execute the maintenance menu, wherein said display means displays executed states of the maintenance commands in the maintenance menu that have been selected and executed, so that the executed states are displayed in the same order as that in which the maintenance commands have been executed.

7. An apparatus according to claim 6, wherein said display means displays a result of measurement in accordance with each maintenance command in the maintenance menu selected and executed.

8. A semiconductor manufacturing apparatus using a plurality of maintenance commands for automatically measuring errors caused by the apparatus or caused by a wafer treatment process, by using measuring functions of the apparatus, said apparatus comprising:

display means for displaying a list of the plurality of maintenance commands which are to be executed, and a record of measured values obtained from each of the executed commands;

console-side control means for enabling an operator to select some of the plurality of maintenance commands displayed by said display means, to generate a maintenance menu in which some of the plurality of maintenance commands are combined as desired by the operator and to edit the maintenance menu;

storage means for storing the maintenance menu generated and edited using said console-side control means; and apparatus-side control means for successively executing the maintenance commands in the maintenance menu stored in said storage means when said apparatus-side control means receives an instruction to execute the maintenance menu.

9. A semiconductor manufacturing method for use with a semiconductor manufacturing apparatus using a plurality of maintenance commands for automatically measuring errors caused by the apparatus or caused by a wafer treatment process, by using measuring functions of the apparatus, said method comprising:

displaying, using display means, a list of the plurality of maintenance commands;

enabling an operator, using console-side control means, to select some of the plurality of maintenance commands displayed by the display means, to generate a maintenance menu in which some of the plurality of maintenance commands are combined as desired by the operator and to edit the maintenance menu;

storing, using storage means, the maintenance menu generated and edited using the console-side control means; and successively executing, using apparatus-side control means, the maintenance commands in the maintenance menu stored in the storage means when the apparatus-side control means receives an instruction to execute the maintenance menu.

10. A semiconductor manufacturing method for use with a semiconductor manufacturing apparatus using a plurality of maintenance commands for automatically measuring errors caused by the apparatus or caused by a wafer treatment process, by using measuring functions of the apparatus, said method comprising:

displaying, using display means, a list of the plurality of maintenance commands;

enabling an operator, using console-side control means, to select some of the plurality of maintenance commands displayed by the display means, to generate a maintenance menu in which some of the plurality of maintenance commands are combined as desired by the operator and to edit the maintenance menu;

displaying, using the display means, a plurality of input cells for inputting the maintenance commands constituting the maintenance menu when the maintenance menu is generated;

generating and editing, using the console-side control means, the maintenance menu as the operator alternately selects one of the input cells and one of the maintenance commands in the maintenance command list;

storing, using storage means, the maintenance menu generated and edited using the console-side control means; and successively executing, using apparatus-side control means, the maintenance commands in the maintenance menu stored in the storage means when the apparatus-side control means receives an instruction to execute the maintenance menu.

11. A method according to claim 10, further comprising differentiating, using the display means, a displayed state of one of the input cells selected at the time of generating the maintenance menu from a displayed state of the unselected input cells.

12. A method according to claim 10, further comprising differentiating, using the display means, a displayed state of some of the maintenance commands in the maintenance command list, which are suitable for input to one of the input cells selected at the time of generating the maintenance menu from a displayed state of maintenance commands in the maintenance command list, which are unsuitable for input to the input cell.

13. A method according to claim 10, further comprising displaying, using the display means, a plurality of maintenance menus stored in the storage means at the time of maintenance menu execution so that one of the maintenance menus can be selected.

14. A semiconductor manufacturing method for use with a semiconductor manufacturing apparatus using a plurality of maintenance commands for automatically measuring errors caused by the apparatus or caused by a wafer treatment process, by using measuring functions of the apparatus, said method comprising:

displaying, using display means, a list of the plurality of maintenance commands;

enabling an operator, using console-side control means, to select some of the plurality of maintenance commands displayed by the display means, to generate a maintenance menu in which some of the plurality of maintenance commands are combined as desired by the operator and to edit the maintenance menu;

storing, using storage means, the maintenance menu generated and edited using the console-side control means;

successively executing, using apparatus-side control means, the maintenance commands in the maintenance menu stored in the storage means when the apparatus-side control means receives an instruction to execute the maintenance menu; and displaying, using the display means, executed states of the maintenance commands in the maintenance menu selected and executed, so that the executed states are displayed in the same order as that in which the maintenance commands have been executed.

15. A method according to claim 14, further comprising displaying, using the display means, a result of measurement in accordance with each maintenance command in the maintenance menu selected and executed.

16. A semiconductor manufacturing method for use with a semiconductor manufacturing apparatus using a plurality of maintenance commands for automatically measuring errors caused by the apparatus or caused by a wafer treatment process, by using measuring functions of the apparatus, said method comprising:

displaying, using display means, a list of the plurality of maintenance commands;

enabling an operator, using console-side control means, to select some of the plurality of maintenance commands displayed by the display means, to generate a maintenance menu in which some of the plurality of maintenance commands are combined as desired by the operator and to edit the maintenance menu;

storing, using storage means, the maintenance menu generated and edited using the console-side control means;

successively executing, using apparatus-side control means, the maintenance commands in the maintenance menu stored in the storage means when the apparatus-side control means receives an instruction to execute the maintenance menu; and displaying, using the display means, a record of measured values obtained from each of the executed maintenance commands.

17. A swmiconductor manufacturing apparatus using a plurality of maintenance commands for automatically measuring errors caused by the apparatus or caused by a wafer treatment process, said apparatus comprising:

display means for displaying a list of the plurality of maintenance commands;

console-side control means for enabling an operator to select some of the plurality of maintenance commands displayed by said display means, to generate a maintenance menu in which some of the plurality of maintenance commands are combined as desired by the operator;

storage means for storing the maintenance menu generated using said console-side control means; and apparatus-side control means for successively executing the maintenance commands in the maintenance menu stored in said storage means when said apparatus-side control means receives an instruction to execute the maintenance menu.

18. A semiconductor manufacturing method for use with a semiconductor manufacturing apparatus using a plurality of maintenance commands for automatically measuring errors caused by the apparatus or caused by a wafer treatment process, said method comprising:

displaying, using display means, a list of the plurality of maintenance commands;

enabling an operator, using console-side control means, to select some of the plurality of maintenance commands displayed by display means, to generate a maintenance menu in which some of the plurality of maintenance commands are combined as desired by the operator;

storing, using storage means, the maintenance menu generated using the console-side control means; and successively executing, using apparatus-side control means, the maintenance commands in the maintenance menu stored in the sotrage means when the apparatus-side control means receives an instruction to execute the maintenance menu.

* * * * *

UNITED STATES PATENT AND TRADEMARK OFFICE
CERTIFICATE OF CORRECTION

PATENT NO. : 6,142,660
DATED : November 7, 2000
INVENTORS : Norihiko UTSUNOMIYA et al.

It is certified that error appears in the above-identified patent and that said Letters Patent is hereby corrected as shown below:

ON THE COVER PAGE:

At Item [30] "Foreign Application Priority Data":
"Jun. 14, 1996 [JP] Japan........8-154073" should read —Jun 14, 1996 [JP] Japan..........8-154073—.

IN THE DISCLOSURE, COLUMN 4:

Line 28, "in" should read —in a—.

Signed and Sealed this

Twenty-second Day of May, 2001

Attest:

NICHOLAS P. GODICI

Attesting Officer

Acting Director of the United States Patent and Trademark Office